United States Patent
Jin et al.

(10) Patent No.: US 11,807,573 B2
(45) Date of Patent: *Nov. 7, 2023

(54) STRENGTHENED GLASS ARTICLES AND METHODS OF FORMING THE SAME

(71) Applicant: CORNING INCORPORATED, Corning, NY (US)

(72) Inventors: Yuhui Jin, Painted Post, NY (US); Joshua James McCaslin, Beaver Dams, NY (US); Jong Se Park, San Jose, CA (US); Vitor Marino Schneider, Painted Post, NY (US); Wei Sun, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,798

(22) Filed: Aug. 23, 2022

(65) Prior Publication Data
US 2022/0402815 A1 Dec. 22, 2022

Related U.S. Application Data

(63) Continuation of application No. 17/318,547, filed on May 12, 2021, now Pat. No. 11,434,167.
(Continued)

(51) Int. Cl.
*B32B 15/04* (2006.01)
*B32B 17/06* (2006.01)
(Continued)

(52) U.S. Cl.
CPC ............ *C03C 21/002* (2013.01); *C03C 3/083* (2013.01)

(58) Field of Classification Search
CPC ..................................................... C03C 21/002
(Continued)

(56) References Cited

U.S. PATENT DOCUMENTS

| 8,713,968 B2 | 5/2014 | Keebler et al. |
| 10,131,567 B2 | 11/2018 | Beall et al. |

(Continued)

FOREIGN PATENT DOCUMENTS

| EP | 3517511 A1 | 7/2019 |
| JP | 2001-246716 A | 9/2001 |

(Continued)

OTHER PUBLICATIONS

European Patent Application No. 21173582.4, Extended European Search Report dated Oct. 14, 2021; 6 pages; European Patent Office.
(Continued)

*Primary Examiner* — Lauren R Colgan

(57) ABSTRACT

A glass article (and methods for forming the same) includes a glass body having first and second opposing primary surfaces and a thickness defined between the primary surfaces. The glass body includes a compressive stress region that includes: a surface stress of greater than about 900 MPa (compressive), a spike region having a first slope, and a tail region having a second slope. The spike region and the tail region can intersect at a knee region having a stress of greater than about 35 MPa (compressive), wherein the stress at the knee region is defined as the point where the asymptotic extrapolation of the spike region and the tail region intersect. The first slope of the spike region can be steeper than about −30 MPa/µm.

16 Claims, 10 Drawing Sheets

Related U.S. Application Data

(60) Provisional application No. 63/025,562, filed on May 15, 2020.

(51) Int. Cl.
*C03C 21/00* (2006.01)
*C03C 3/083* (2006.01)

(58) Field of Classification Search
USPC ........................................... 428/410
See application file for complete search history.

(56) References Cited

U.S. PATENT DOCUMENTS

| | | | |
|---|---|---|---|
| 10,239,784 B2* | 3/2019 | Oram | C03C 3/097 |
| 10,266,447 B2 | 4/2019 | Hu et al. | |
| 10,271,442 B2 | 4/2019 | Gross et al. | |
| 10,787,387 B2 | 9/2020 | Gross et al. | |
| 10,934,209 B2* | 3/2021 | Schneider | C03C 17/30 |
| 11,021,393 B2* | 6/2021 | Oram | C03C 3/097 |
| 11,028,014 B2* | 6/2021 | Harris | H05K 5/0017 |
| 11,053,162 B2* | 7/2021 | Andrews | C03C 21/002 |
| 11,434,167 B2* | 9/2022 | Jin | C03C 3/085 |
| 2010/0009154 A1* | 1/2010 | Allan | C03C 3/093 |
| | | | 501/67 |
| 2010/0035745 A1* | 2/2010 | Murata | C03C 3/093 |
| | | | 501/68 |
| 2012/0052271 A1* | 3/2012 | Gomez | C03C 21/002 |
| | | | 65/30.14 |
| 2015/0030834 A1* | 1/2015 | Morey | C03C 3/093 |
| | | | 73/12.06 |
| 2015/0030840 A1 | 1/2015 | Gomez et al. | |
| 2015/0239775 A1* | 8/2015 | Amin | C03C 21/00 |
| | | | 428/220 |
| 2015/0259244 A1* | 9/2015 | Amin | C03C 21/002 |
| | | | 428/410 |
| 2015/0368148 A1* | 12/2015 | Duffy | C03C 3/083 |
| | | | 428/220 |
| 2015/0368153 A1* | 12/2015 | Pesansky | C03C 3/097 |
| | | | 428/220 |
| 2016/0122239 A1* | 5/2016 | Amin | C03C 21/002 |
| | | | 428/220 |
| 2016/0122240 A1* | 5/2016 | Oram | C03C 3/097 |
| | | | 501/63 |
| 2017/0121210 A1 | 5/2017 | Rai et al. | |
| 2017/0197384 A1 | 7/2017 | Finkeldey et al. | |
| 2017/0274626 A1 | 9/2017 | Ukrainczyk et al. | |
| 2017/0291849 A1 | 10/2017 | Dejneka et al. | |
| 2017/0295657 A1* | 10/2017 | Gross | C03C 3/093 |
| 2018/0105461 A1* | 4/2018 | Schneider | C03C 21/002 |
| 2018/0265397 A1 | 9/2018 | Murayama et al. | |
| 2019/0077262 A1 | 3/2019 | Benjamin et al. | |
| 2019/0084870 A1* | 3/2019 | Beall | C03C 3/091 |
| 2019/0104627 A1* | 4/2019 | Chambliss | C03C 4/18 |
| 2019/0352226 A1* | 11/2019 | Harris | C03C 21/002 |
| 2019/0375679 A1* | 12/2019 | Gross | C03C 21/002 |
| 2020/0002225 A1* | 1/2020 | Schneider | C03C 21/002 |
| 2020/0123050 A1* | 4/2020 | Black | C03C 21/002 |
| 2020/0156994 A1* | 5/2020 | Li | C03C 21/002 |
| 2021/0130231 A1* | 5/2021 | Schneider | H05K 5/0017 |
| 2021/0292225 A1* | 9/2021 | Umada | C03C 21/002 |

FOREIGN PATENT DOCUMENTS

| | | |
|---|---|---|
| WO | 2012/118612 A1 | 9/2012 |
| WO | 2019/010401 A1 | 1/2019 |
| WO | 2019/075065 A1 | 4/2019 |

OTHER PUBLICATIONS

Karlsson et al., "Trends in Effective Diffusion Coefficients for Ion-Exchange Strengthening of Soda-Lime-Silicate Glasses", Frontiers in Materials, Apr. 2017, 11 pages.

* cited by examiner

STRENGTHENED GLASS ARTICLES AND METHODS OF FORMING THE SAME

CROSS-REFERENCE TO RELATED APPLICATIONS

This application is a continuation and claims the benefit of priority under 35 USC § 120 of U.S. patent application Ser. No. 17/318,547 filed on May 12, 2021, which claims the benefit of priority under 35 U.S.C. § 119 of U.S. Provisional Application Ser. No. 63/025,562 filed on May 15, 2020, the contents of which are relied upon and incorporated herein by reference in their entireties.

FIELD

The present disclosure generally relates to strengthened glass articles and methods of forming them, and particularly to chemically strengthened glass articles suitable for use in the automotive industry and methods of forming them.

BACKGROUND

Chemically strengthened glass is utilized in a variety of different applications, an example of which includes handheld electronic devices, such as mobile phones. Chemical strengthening, also referred to as ion exchange, of a glass can create a stress profile within the glass that provides the glass with the desired characteristics, such as strength or frangibility, based on the intended use of the glass.

Glass utilized in the automotive industry, such as may be used in windshields, windows, display screens, and mirrors, may be required to meet certain safety standards, an example of which includes the headform impact test (HIT). HIT regulations are defined by government regulations, and thus may vary by geographic region. For example, in the U.S. the relevant HIT regulation is the Federal Motor Vehicle Safety Standard (FMVSS) 201. In China, the relevant HIT regulation is GB 11552-2009, and in Europe and United Nations countries, the relevant HIT regulation is the United Nations Economic Commission for Europe (ECE) UN-R21. Conventional glasses utilized in the automotive industry often include glass laminates, which can provide sufficient impact resistance for automotive applications at reasonable cost. However, these glass laminates may be heavy and may not provide all of the desired characteristics for a particular application.

Chemical strengthening can be used with relatively thin glass materials to produce a material having high levels of compressive stress. However, conventional ion exchange techniques may be limited in their ability to produce a stress profile having a level of compressive stress and other characteristics suitable for meeting safety standards for use in automotive applications. Another challenge with ion exchange techniques is providing a process that can treat a sufficient glass load to be feasible for use in a manufacturing process before requiring the replacement and/or regeneration of the process materials.

In view of these considerations, there is a need for strengthened glass articles having stress profiles that can satisfy automotive safety standards, such as a headform impact test, and which can be formed using an ion exchange process that can chemically strengthen a sufficient glass load to be suitable for use in a manufacturing setting.

SUMMARY

According to one aspect of the present disclosure, a glass article includes a glass body having first and second opposing primary surfaces and a thickness defined between the primary surfaces. The glass body includes a compressive stress region that includes: a surface stress of greater than about 900 MPa (compressive), a spike region having a first slope, and a tail region having a second slope. The spike region and the tail region can intersect at a knee region having a stress of greater than about 35 MPa (compressive), wherein the stress at the knee region is defined as the point where the asymptotic extrapolation of the spike region and the tail region intersect. The first slope of the spike region can be steeper than about −30 MPa/μm.

According to another aspect of the present disclosure, a method of forming a plurality of glass articles is provided. The method can include a first ion exchange step including immersing a glass article in a first molten salt bath including a potassium salt and a sodium salt for a first predetermined time period, wherein the glass article includes a glass body having first and second opposing primary surfaces and a thickness defined between the primary surfaces and a second ion exchange step, following the first ion exchange step, including immersing the glass article in a second molten salt bath including a potassium salt for a second predetermined time period to form a compressive stress region including a surface stress of greater than about 900 MPa (compressive). The method can also include repeating the first ion exchange step and the second ion exchange step for one or more additional glass articles, wherein an amount of the increase in the surface stress of each glass article in the second ion exchange process decreases by less than about 6 MPa per cycle of first and second ion exchange steps for a glass article load having a surface area of 0.0228 $m^2$ per kilogram of potassium salt in the second molten salt bath.

These and other aspects, objects, and features of the present disclosure will be understood and appreciated by those skilled in the art upon studying the following specification, claims, and appended drawings.

DETAILED DESCRIPTION

Figure 1:
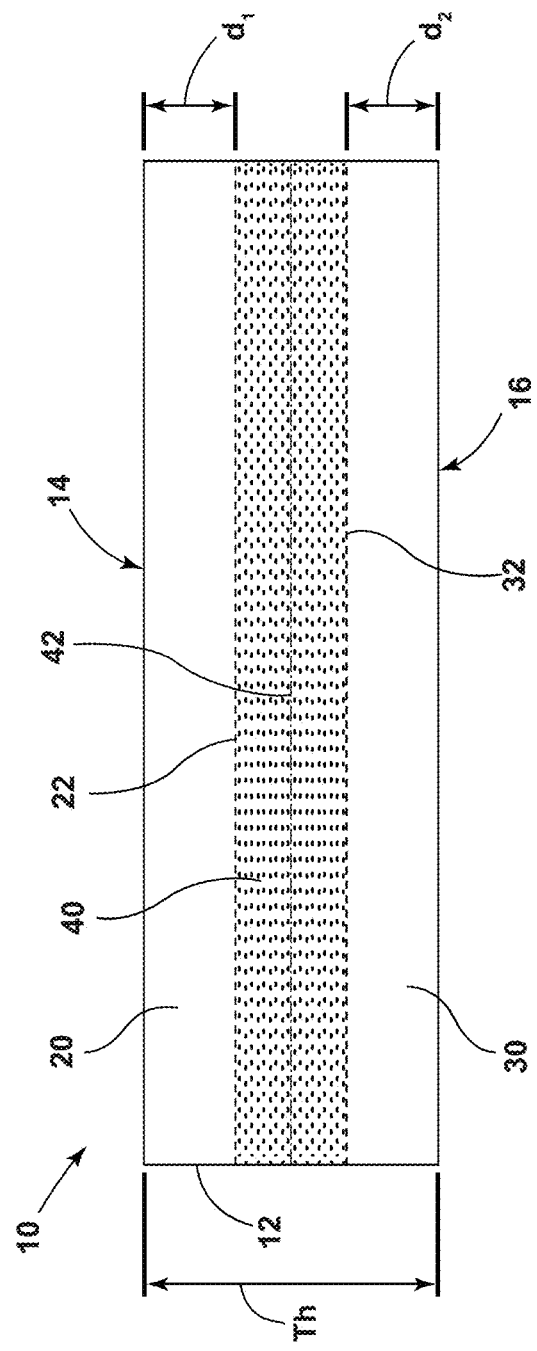
FIG. 1 is a schematic cross-sectional view of a chemically strengthened glass article, according to an aspect of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Stress profiles reported herein were determined using a combination of techniques. The stress profiles reported herein were measured via the Refractive Near Field (RNF) method where the center tension (CT) is similar to measurements of CT provided by scattering polarimetry using a SCALP-5 made by Glasstress Co., Estonia. The RNF data does not always accurately provide stress information in the first ~2 μm from the sample surface, and thus the RNF data is extrapolated to the surface. The stress at the surface (CS) was measured by an FSM-6000 LE surface stress meter from Orihara, Japan. The stress profile near the center reflects the measurements obtained using RNF, while near the surface, the stress profile is reflective of the data obtained from the FSM-6000 LE measurements. In this manner, the two measurement techniques are combined to form a representation of the entire stress profile of the article from the surface to the center of the article. Typically, the stress profiles reported herein measured using the FSM-6000 LE instrument are reported at a wavelength of 589 nm. However, depending on the thickness of the potassium layer at the surface of the sample, different wavelengths may be used. The ion exchanged glass of the present disclosure includes a spike region near the surface and a tail region deeper inside the glass. As used herein, compressive stress is represented by stress values greater than 0 (positive values "+") and tensile stress is represented by stress values less than 0 (negative values "−").

As used herein, the center tension (CT) is the stress, either compressive or tensile, at a center of the glass.

As used herein, surface stress and stress at the surface (CS) are used interchangeably to refer to the stress measured at the surface of the glass. The surface stress (CS) can provide an estimate of the surface compression, which may correlate with an amount of stress to be applied to the surface of the article to cause a failure of the glass.

As used herein, the depth of layer ($DOL_k$) refers to the depth of a spike region in the stress profile that is related to the diffusion depth of ions near the spike.

As used herein, the stress of the knee ($CS_k$) is the stress at the asymptotic extrapolation of the spike region of the stress profile and the tail region of the stress profile. The stress of the knee ($CS_k$) can be compressive or tensile.

As used herein, the depth of compression (DOC) refers to the location within the glass where the stress is first zero and changes from compression (+) to tensile (−), or vice versa.

As used herein, the terms "frangible" and "frangibility" are used to refer to those modes of violent or energetic fragmentation of a chemically strengthened glass article when subjected to an impact by a sharp object, absent any external constraints (e.g., coatings, adhesive tie layers). The term "non-frangible" is used herein to refer to glasses that do not exhibit frangible behavior, i.e., they do not exhibit violent or energetic fragmentation when subjected to an impact by a sharp object.

As used herein, the term "ion exchangeable" is used to mean that a glass is capable of exchanging cations located at or near a surface of the glass with cations of the same valence. The term "ion exchange" can be used interchangeably with the terms "treatment" or "process" to refer to the act of treating a glass in a manner that induces the exchange of cations located at or near a surface of the glass with cations of the same valence.

Unless otherwise specified, concentrations of the constituent components of a glass are specified in weight percent (wt %) on an oxide basis unless otherwise specified. As used herein, the term "about" with respect to the concentration of a constituent component is intended to encompass values within ±0.2 wt %.

The present illustrated embodiments reside primarily in glasses and glass articles having a compressive stress region that includes a surface stress (CS) of greater than about 900 MPa (compressive) and methods of forming such glasses. Accordingly, the article components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Embodiments of the present disclosure generally relate to glasses that are chemically strengthened using an ion exchange process including at least two ion exchange steps that are configured to provide the glasses with a stress profile that is suitable for use in satisfying safety standards for automotive applications. Further, the glass articles of the present disclosure can have a sufficiently high surface stress (CS) and stress profile depth to satisfy automotive safety standards for glass, such as a headform impact test (HIT).

In order to meet automotive safety standards, such as a headform impact test (HIT), the glass would typically have to have a high surface stress (CS). Ion exchange is an example of a process that can be used to chemically strengthen glasses. In a typical ion exchange process, the glass is placed in an ion exchange bath that includes a source of alkali cations that can be exchanged with smaller alkali cations within the glass. The exchange of ions between the glass and the bath can produce a layer near the surface of the glass that is under compressive stress and which extends to a certain depth within the glass. The high surface stress (CS) desired for automotive applications can limit the number of cycles that the ion exchange bath can be used to chemically strengthen a glass to provide the glass with the desired stress profile. Embodiments of the present disclosure provide a method by which an ion exchange bath can be utilized in multiple cycles (e.g., as in a manufacturing operation) to generate glasses having the desired stress profile before the ion exchange bath needs to be changed or regenerated.

According to an embodiment of the present disclosure, the glass articles can include a compressive stress region that includes a surface stress of greater than about 900 MPa (compressive), a spike region extending from the surface into a body of the glass, and a tail region extending between the spike region and the center of the glass. In one embodiment, the spike region and tail region of the stress profile can be obtained through a multi-step ion exchange process. In one example, the multi-step ion exchange process includes a first ion exchange step and a second ion exchange step.

FIG. 1 illustrates a schematic of a cross-section of a chemically strengthened glass article 10 according to embodiments of the present disclosure. The glass article 10 includes a glass body 12 having a thickness ("Th"), a first primary surface 14, and a second primary surface 16. The glass article 10 can be treated in an ion exchange process to chemically strengthen the glass article 10 and generate a stress profile within the glass body 12. The glass article 10 can include a first compressive stress region 20 that extends to a first depth of compression (DOC) 22 that extends to a depth $d_1$ with respect to the first primary surface 14. The glass article 10, in some embodiments, can also have a second compressive stress region 30 that extends to a second depth of compression (DOC) 32 at a depth $d_2$ with respect to the second primary surface 16. The glass article 10 can also include a central tensile stress region 40 that extends between the first and second compressive stress regions 20 and 30, respectively, and a center or mid-point 42 at a center of the glass body 12.

The glass article 10 described herein can have a stress profile that includes a first and second compressive stress region 20, 30 that varies as a function of depth with respect to each of the first and second primary surfaces 14, 16, respectively. While aspects of the present disclosure are discussed in the context of a stress profile extending from a single primary surface 14 of the glass article 10, it is understood that the glass article 10 can include a stress profile extending from a second primary surface 16 of the glass article 10 that is similar to the stress profile extending from the first primary surface 14. For example, with respect to the exemplary embodiment of FIG. 1, the first and second primary surfaces 14 and 16, respectively, can have substantially identical first and second stress profiles extending from their respective surfaces. In another example, the glass article 10 may include different stress profiles extending from the first and second primary surfaces 14, 16.

The glass article 10 can have any suitable dimensions. In some embodiments, the thickness Th of the glass article 10 is from about 0.2 mm to about 1.3 mm. For example, the thickness Th can be from about 0.2 mm to about 1.3 mm, about 0.2 mm to about 1.2 mm, about 0.2 mm to about 1.1 mm, about 0.2 mm to about 1.0 mm, about 0.2 mm to about 0.9 mm, about 0.2 mm to about 0.8 mm, about 0.2 mm to about 0.7 mm, about 0.2 mm to about 0.6 mm, about 0.2 mm to about 0.5 mm, about 0.5 mm to about 1.3 mm, about 0.5 mm to about 1.2 mm, about 0.5 mm to about 1.1 mm, about 0.5 mm to about 1.0 mm, about 0.5 mm to about 0.9 mm, about 0.5 mm to about 0.8 mm, about 0.8 mm to about 1.3 mm, about 0.8 mm to about 1.2 mm, about 0.8 mm to about 1.1 mm, about 0.8 mm to about 1.0 mm, about 0.9 mm to about 1.3 mm, about 0.9 mm to about 1.2 mm, or about 0.9 mm to about 1.1 mm. For example, the thickness Th of the glass article 10 can be about 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, and all thickness values between the foregoing thicknesses. While the glass article 10 is illustrated as a planar article, such as a sheet or plate, it is understood that the glass article 10 may be curved and/or have any desired 3-dimensional shape or dimensions.

Figure 2:
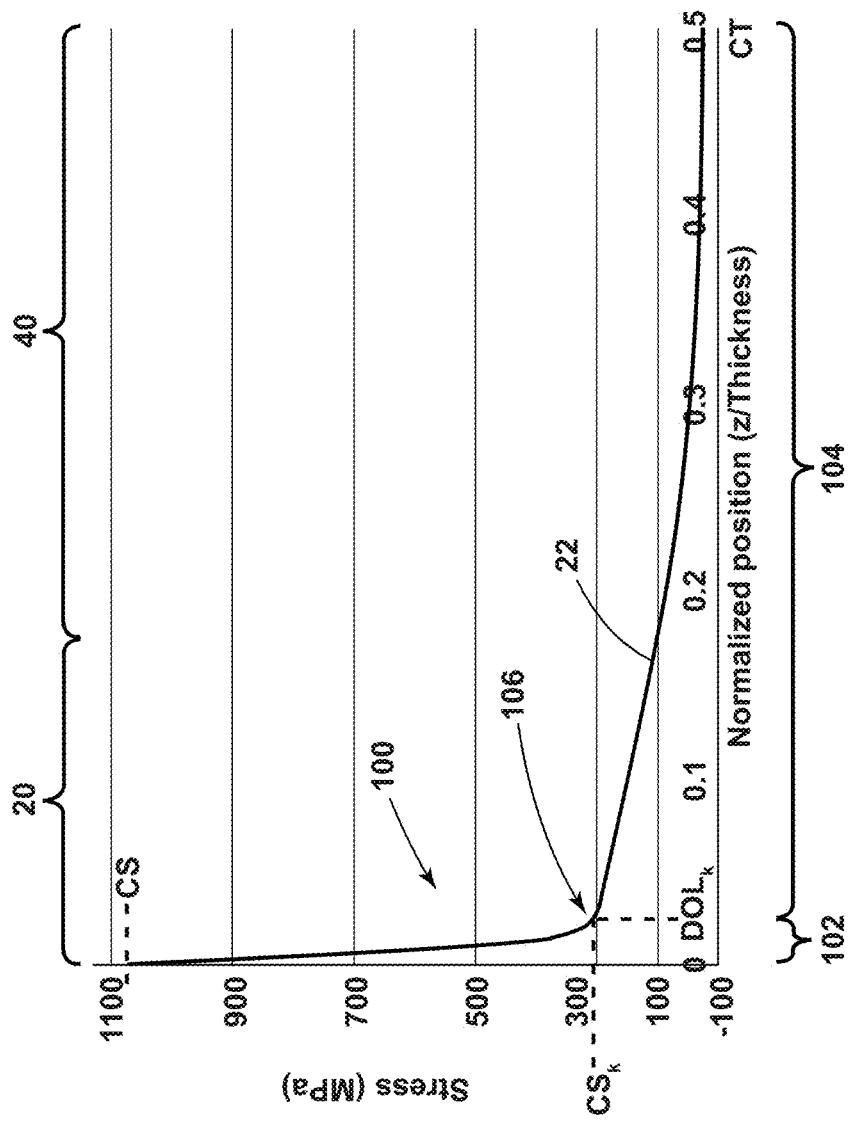
FIG. 2 is a schematic of a stress profile of the chemically strengthened glass article of FIG. 1, according to an aspect of the present disclosure.

FIG. 2 schematically illustrates an exemplary stress profile 100 of the article 10 according to an embodiment of the present disclosure. The x-axis is shown as a normalized position (z/Th), where the total thickness Th of the body 12 is Th and the particular position or depth within the article 10 is given by z. The normalized position is determined as the distance from the first primary surface 14 divided by the total thickness Th of the body 12 (e.g., a normalized position of 0.5 corresponds to the center 42 of the body 12). The stress profile 100 shown in FIG. 2 corresponds to a first portion of the glass body 12 extending from the first primary surface 14 (normalized position 0) to the center 42 of the body 12 (normalized position 0.5). It will be understood that the stress profile 100 can optionally include a second portion extending from the center 42 of the glass body 12 to the second primary surface 16 that is substantially a mirror image of the stress profile 100 shown from 0 to 0.5 (normalized position).

The stress profile 100 includes a maximum compressive stress at the first primary surface 14, also referred to as surface stress (CS), of greater than about 900 MPa (compressive). In some embodiments, the surface stress (CS) can be greater than about 900 MPa, greater than about 925 MPa, greater than about 950 MPa, greater than about 975 MPa, greater than about 1000 MPa, greater than about 1025 MPa, greater than about 1050 MPa, greater than about 1075 MPa, greater than about 1100 MPa, greater than about 1125 MPa, or greater than about 1150 MPa (compressive). For example, the surface stress (CS) can be from about 900 MPa to about 1200 MPa, about 900 MPa to about 1175 MPa, about 900 MPa to about 1160 MPa, about 900 MPa to about 1155 MPa, about 900 MPa to about 1150 MPa, about 900 MPa to about 1100 MPa, about 900 MPa to about 1075 MPa, about 900 MPa to about 1050 MPa, about 900 MPa to about 1000 MPa, about 950 MPa to about 1200 MPa, about 950 MPa to about 1175 MPa, about 950 MPa to about 1160 MPa, about 950 MPa to about 1155 MPa, about 950 MPa to about 1150 MPa, about 950 MPa to about 1100 MPa, about 950 MPa to about 1075 MPa, about 950 MPa to about 1050 MPa, about 950 MPa to about 1000 MPa, about 1000 MPa to about 1200 MPa, about 1000 MPa to about 1175 MPa, about 1000 MPa to about 1160 MPa, about 1000 MPa to about 1155 MPa, about 1000 MPa to about 1150 MPa, about 1000 MPa to about 1100 MPa, about 1050 MPa to about 1200 MPa, about 1050 MPa to about 1175 MPa, about 1050 MPa to about 1160 MPa, about 1050 MPa to about 1155 MPa, about 1050 MPa to about 1150 MPa, about 1050 MPa to about 1100 MPa, about 1100 MPa to about 1200 MPa, or about 1100 MPa to about 1175 MPa (compressive). In some examples, the surface stress (CS) can be about 900 MPa, about 925 MPa, about 926 MPa, about 950 MPa, about 957 MPa, about 975 MPa, about 1000 MPa, about 1025 MPa, about 1026 MPa, about 1050 MPa, about 1066 MPa, about 1075 MPa, about 1095 MPa, about 1100 MPa, about 1125 MPa, about 1130 MPa, about 1150 MPa, about 1155 MPa, about 1160 MPa, about 1175 MPa, about 1200 MPa, or any surface stress (compressive) between these values.

The stress profile 100 can include a spike region 102 and a tail region 104. The spike region 102 extends from the first primary surface 14 to a depth of layer ($DOL_k$) that corresponds to a diffusion depth of ions as a result of an ion exchange process. The tail region 104 extends from the depth of layer ($DOL_k$) through the center 42 of the glass body 12 (normalized position 0.5). The depth of layer ($DOL_k$) can be greater than about 10 μm. In some embodiments, the depth of layer ($DOL_k$) can be greater than about 10 μm, greater than about 15 μm, or greater than about 20 μm. For example, the depth of layer ($DOL_k$) can be from about 10 μm to about 50 μm, about 10 μm to about 40 μm, about 10 μm to about 30 μm, about 10 μm to about 25 μm, about 10 μm to about 20 μm, about 15 μm to about 50 μm, about 15 μm to about 40 μm, about 15 μm to about 30 μm, about 15 μm to about 25 μm, about 15 μm to about 20 μm, about 20 μm to about 50 μm, about 20 μm to about 40 μm, about 20 μm to about 30 μm, or about 20 μm to about 25 μm. In some examples, the depth of layer ($DOL_k$) can be about 10 μm, about 12 μm, about 15 μm, about 16 μm, about 17 μm, about 17.6 μm, about 18 μm, about 18.2 μm, about 19 μm, about 20 μm, about 20.4 μm, about 21 μm, about 22 μm, about 23 μm, about 24 μm, about 24.5 μm, about 25 μm, about 30 μm, about 40 μm, about 50 μm, or any depth between these values.

The spike region 102 and the tail region 104 can intersect at a knee region 106 having a stress of the knee ($CS_k$) of greater than about 50 MPa (compressive). The knee region 106 is defined as the point where the asymptotic extrapolation of the spike region 102 and the tail region 104 intersect. According to one embodiment, the stress of the knee ($CS_k$) can be greater than about 35 MPa, greater than about 40 MPa, greater than about 45 MPa, greater than about 50 MPa, greater than about 55 MPa, greater than about 60 MPa, greater than about 65 MPa, greater than about 70 MPa, greater than about 80 MPa, greater than about 90 MPa, or greater than about 100 MPa (compressive). For example, the stress of the knee ($CS_k$) can be from about 35 MPa to about 120 MPa, about 35 MPa to about 110 MPa, about 35 MPa to about 100 MPa, about 35 MPa to about 90 MPa, about 35 MPa to about 80 MPa, about 35 MPa to about 70 MPa, about 35 MPa to about 60 MPa, about 35 MPa to about 50 MPa, about 40 MPa to about 120 MPa, about 40 MPa to about 110 MPa, about 40 MPa to about 100 MPa, about 40 MPa to about 90 MPa, about 40 MPa to about 80 MPa, about 40 MPa to about 70 MPa, about 40 MPa to about 60 MPa, about 40 MPa to about 50 MPa, about 50 MPa to about 120 MPa, about 50 MPa to about 110 MPa, about 50 MPa to about 100 MPa, about 50 MPa to about 90 MPa, about 50 MPa to about 80 MPa, about 50 MPa to about 70 MPa, about 60 MPa to about 120 MPa, about 60 MPa to about 110 MPa, about 60 MPa to about 100 MPa, about 60 MPa to about 90 MPa, about 60 MPa to about 80 MPa, about 80 MPa to about 120 MPa, about 80 MPa to about 110 MPa, about 80 MPa to about 100 MPa, about 80 MPa to about 90 MPa, about 90 MPa to about 120 MPa, about 90 MPa to about 110 MPa, about 90 MPa to about 100 MPa, or about 100 MPa to about 120 MPa (compressive). In some examples, the stress of the knee ($CS_k$) is about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, about 105 MPa, about 110 MPa, about 115 MPa, about 120 MPa (compressive), or any stress value between these values.

According to an aspect of the present disclosure, the spike region 102 can have a slope that is steeper than about −30 MPa/μm. As used herein, the term "steeper" with respect to slope is used to indicate that the absolute value of the slope is greater in comparison; in other words the slope of the line is greater in magnitude relative to another value. The phrase "less steep" is used herein with respect to slope to indicate that the absolute value of the slope is smaller in comparison; in other words the slope of the line is smaller in magnitude relative to another value. According to one embodiment, the spike region 102 has a slope that is steeper than about −30 MPa/μm, about −35 MPa/μm, about −40 MPa/μm, about −45 MPa/μm, about −50 MPa/μm, about −55 MPa/μm, or about −60 MPa/μm. For example, the spike region 102 can have a slope that is from about −30 MPa/μm to about −70 MPa/μm, about −30 MPa/μm to about −65 MPa/μm, about −30 MPa/μm to about −60 MPa/μm, about −30 MPa/μm to about −55 MPa/μm, about −35 MPa/μm to about −70 MPa/μm, about −35 MPa/μm to about −65 MPa/μm, about −35 MPa/μm to about −60 MPa/μm, about −35 MPa/μm to about −55 MPa/μm, about −40 MPa/μm to about −70 MPa/μm, about −40 MPa/μm to about −65 MPa/μm, about −40 MPa/μm to about −60 MPa/μm, about −40 MPa/μm to about −55 MPa/μm, about −50 MPa/μm to about −70 MPa/μm, about −50 MPa/μm to about −65 MPa/μm, or about −50 MPa/μm to about −60 MPa/μm.

The tail region 104 can have a slope, as measured between the knee region 106 and the depth of compression (DOC) 22, which is less steep than the spike region 102. In some embodiments the slope of the tail region 104 is steeper than about (241)/(Th), in units of MPa/μm, where Th is the thickness of the glass body 12 in μm. The expression for the slope of the tail region 104 was determined by having a stress near the knee of about 20 MPa and a DOC of about 100 μm. For example, for a sample having a thickness Th of 1100 μm, an exemplary slope of the tail region 104 would be about 0.22 MPa/μm. In some examples, the slope of the tail region 104 may be steeper than about (241)/(Th), steeper than about (100)/(Th), or steeper than about (50)/(Th).

The glass article 10 includes a depth of compression (DOC) 22, where the stress inside the glass body 12 is 0, of equal to or greater than about 0.16*(Th), where Th is the thickness of the glass body 12. For example, for a glass article 10 having a thickness Th of about 1100 μm, the depth of compression (DOC) 22 can be from about 150 μm to about 200 μm, about 160 μm to about 200 μm, about 170 μm to about 200 μm, about 180 μm to about 200 μm, or about 190 μm to about 200 μm. For a parabolic stress profile, the maximum depth of compression (DOC) 22 is typically about 0.2115*(Th), which is based at least in part on both sides of the stress profile curve being the same. As a stress profile having a spike region 102 is changed, the maximum depth of compression (DOC) 22 may decrease to less than about 0.21*(Th). In some examples, the maximum DOC may decrease to about 0.18*(Th) or about 0.19*(Th), based at least in part on the spike region 102. Without being limited by any theory, it is believed that having a DOC of ≥about 0.16*(Th) may provide the glass article 10 with a desired drop performance. In some aspects, the depth of compression (DOC) 22 can be ≥about 0.16*(Th), ≥about 0.18*(Th), ≥about 0.19*(Th), or ≥about 0.20*(Th). For example, the depth of compression (DOC) 22 may be from about 0.16*(Th) to about 0.2115*(Th), about 0.16*(Th) to about 0.21*(Th), about 0.16*(Th) to about 0.20*(Th), about 0.16*(Th) to about 0.19*(Th), about 0.16*(Th) to about 0.18*(Th), about 0.17*(Th) to about 0.2115*(Th), about 0.17*(Th) to about 0.21*(Th), about 0.17*(Th) to about 0.20*(Th), about 0.17*(Th) to about 0.19*(Th), about 0.18*(Th) to about 0.2115*(Th), about 0.18*(Th) to about 0.21*(Th), about 0.18*(Th) to about 0.20*(Th), about 0.18*(Th) to about 0.19*(Th), about 0.19*(Th) to about 0.2115*(Th), about 0.19*(Th) to about 0.21*(Th), or about 0.19*(Th) to about 0.20*(Th).

The first compressive stress region 20 of the glass article 10 can extend from the first primary surface 14 to the first depth of compression (DOC) 22. The tensile stress region 40 can extend from the first depth of compression (DOC) 22 through at least the center 42 of the glass body 12. The glass article 10 can have a center tension (CT), i.e., a tensile stress at the center 42 of the glass body 12 (normalized position 0.5), that is greater than about 40 MPa (tensile). In some examples, the center tension (CT) is greater than about 40 MPa, greater than about 45 MPa, greater than about 50 MPa, greater than about 55 MPa, greater than about 60 MPa, or greater than about 65 MPa (tensile). For example, the center tension (CT) can be from about 40 MPa to about 70 MPa, about 40 MPa to about 65 MPa, about 40 MPa to about 60 MPa, about 40 MPa to about 50 MPa, about 45 MPa to about 70 MPa, about 45 MPa to about 65 MPa, about 45 MPa to about 45 MPa, about 50 MPa to about 70 MPa, about 50 MPa to about 65 MPa, about 50 MPa to about 60 MPa, or about 60 MPa to about 70 MPa.

According to one aspect of the present disclosure, the chemically strengthened glass articles described herein can be non-frangible. Non-frangible glass articles of the present disclosure can have a center tension (CT) according to formula (I):

$$CT < ((E/(68 \text{ GPa}))*(75 \text{ MPa})*(1 \text{ mm})^{0.5})/(Th)^{0.5} \qquad (I)$$

wherein E is the Young's modulus of the glass body 12, measured in GPa, and Th is the thickness of the glass body 12, measured in mm. Without wishing to be limited by any theory, the Young's modulus E for a representative aluminosilicate glass having a composition including about 64 mol % $SiO_2$, 16 mol % $Al_2O_3$, 11 mol % $Na_2O$, 6.25 mol % $Li_2O$, 1 mol % $TiO_2$, 0.04 mol % $SnO_2$ and 2.5 mol % $P_2O_5$ is about 68 GPa and the frangibility limit for this glass was found experimentally to be about 75 MPa. The frangibility limit was found to vary approximately with the inverse of the square root of the thickness of the glass and linearly with the Young's modulus E of the glass. Formula (I) was obtained by normalizing these relationships for application to glasses having different thicknesses and/or Young's Modulus E.

The glass articles of the present disclosure (e.g., the glass article 10 depicted in FIG. 1) can include any suitable glass that can be chemically strengthened in an ion exchange process that exchanges potassium ions ($K^+$) for smaller cations present in the glass. Without being bound by any theory, the glass articles of the present disclosure may be chemically strengthened in an ion exchange process in which ions at or near the surface of the glass are replaced by (also referred to as exchanged) with larger ions, which typically have the same valence number or oxidation state. According to one embodiment, the chemically strengthened glasses disclosed herein can be formed by treating an alkali aluminosilicate glass including lithium in an ion exchange process to create a desired stress profile as described herein. Non-limiting examples of glasses suitable for treating according to the present disclosure include compositions including, among other components, $SiO_2$ in a range from about 55 mol % to about 75 mol %, $B_2O_3$ in an amount in a range from about 0 mol % to about 10 mol %, $Al_2O_3$ in an amount in a range from about 10 mol % to about 25 mol %, $Na_2O$ in an amount in a range from about 0 mol % to about 15 mol %, $K_2O$ in an amount in a range from about 0 mol % to about 4 mol %, $LiO_2$ in a range from about 0 mol % to about 15 mol % (or from about 5 mol % to about 12 mol %), MgO in an amount in a range from about 0 mol % to about 7 mol %, ZnO in an amount in a range from about 0 mol % to about 2 mol %, CaO in a range from about 0 mol % to about 2 mol %, $SnO_2$ in non-zero amount up to about 1 mol %, and $P_2O_5$ in an amount in a range from about 0 mol % to about 4 mol %. Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes Al2O3 in a range from about 7 mol % to about 20 mol %, from about 7 mol % to about 19 mol %, from about 7 mol % to about 18 mol %, from about 7 mol % to about 17 mol %, from about 7 mol % to about 16 mol %, from about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 20 mol %, from 9 mol % to about 20 mol %, from about 9 mol % to about 20 mol %, from about 10 mol % to about 20 mol %, from about 11 mol % to about 20 mol %, from about 12 mol % to about 20 mol %, from about 11 mol % to about 18 mol %, or from about 13 mol % to about 17 mol %, and all ranges and sub-ranges therebetween. In one or more embodiments, the upper limit of Al2O3 may be about 16 mol %, 16.2 mol %, 16.4 mol %, 16.6 mol %, or 16.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 10 mol %, from about 0 mol % to about 9 mol %, from about 0 mol % to about 8 mol %, from about 0 mol % to about 7 mol %, from about 0 mol % to about 6 mol %, from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 10 mol %, from about 0.1 mol % to about 9 mol %, from about 0.1 mol % to about 8 mol %, from about 0.1 mol % to about 7 mol %, from about 0.1 mol % to about 6 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non zero amount of $P_2O_5$ up to and including 3 mol %, 2.5 mol %, 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of R2O in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of K2O.

In one or more embodiments, the glass composition is substantially free of $Li_2O$. In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$. In one or more embodiments, the glass composition may include a total amount of RO (which is the total amount of alkaline earth metal oxide such as CaO, MgO, BaO, ZnO and SrO) in a range from about 0 mol % to about 6 mol %. In some embodiments, the glass composition includes a non-zero amount of RO up to about 6 mol %. In one or more embodiments, the glass composition comprises RO in an amount from about 0 mol % to about 5 mol %, from about 0 mol % to about 4 mol %, from about 0 mol % to about 3 mol %, from about 0 mol % to about 2 mol %, from about 0 mol % to about 1.5 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 2 mol %, less than about 1.5 mol %, less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

According to an embodiment of the present disclosure, an elastic energy stored by the stress profile of the glass articles of the present disclosure can be determined according to formula (II):

$$W_{el} = \frac{(1-v)}{E} \int \sigma^2 dx \quad \text{(II)}$$

wherein v is the Poisson ratio of the glass, E is the Young's modulus of the glass, and σ is the stress. Unless otherwise specified, the units for the stress σ are MPa (equivalent to $10^6$ N/m$^2$). For a representative aluminosilicate glass having a composition including about 64 mol % $SiO_2$, 16 mol % $Al_2O_3$, 11 mol % $Na_2O$, 6.25 mol % $Li_2O$, 1 mol % $TiO_2$, 0.04 mol % $SnO_2$ and 2.5 mol % $P_2O_5$, the Poisson ratio v is about 0.22 and the Young's modulus E is about 68 GPa.

For a symmetric stress profile, the elastic energy (per unit area of glass) in the compressive stress region 20 can be determined according to formula (III) and the elastic energy (per unit area of glass) in the tensile stress region 40 from the depth of compression (DOC) 22 to the center 42 of the glass body 12 can be determined according to formula (IV):

$$W_{el}^{comp} = 2\frac{(1-v)}{E} \int_0^{DOC} \sigma^2 dx \quad \text{(III)}$$

$$W_{el}^{tens} = 2\frac{(1-v)}{E} \int_{DOC}^{0.5T} \sigma^2 dx \quad \text{(IV)}$$

The factor of "2" is used to take into account the symmetry of the stress profile (extending between the first primary surface 14 and the second primary surface 16), so calculation of the integrals for only the first half of the stress profile is necessary (i.e., the stress profile from the first primary surface 14 to the center 42 of the glass body 12).

The total elastic energy stored in the glass body 12 can be represented by a sum of the elastic energy of the single compressive stress region 20 and half the tensile stress region 40, according to formula (V):

$$W_{el}^{tot} = (W_{el}^{comp} + W_{el}^{tens}) \quad (V)$$

The units for elastic energy (per unit substrate) include:

$$[w_{el}] = MPa^{-1} * MPa * 10^6 \frac{N}{m^2} * 10^{-6} m \equiv \frac{N*m}{m^2} \equiv \frac{J}{m^2} \equiv \frac{\mu J}{mm^2}$$

Another metric is the elastic energy per unit substrate area per unit thickness of the substrate, which is expressed in units of J/m² mm. The elastic energy per unit substrate area per unit thickness of the substrate is independent of the thickness of the glass and is valid for thicknesses in the range of from about 50 μm to about 2000 μm.

In one embodiment, a frangibility criterion may be represented by a normalized total energy, compressive energy, and tensile energy according to formulas (VI), (VII), and (VIII), respectively, all of which are in units of MPa²m:

$$W_{norm}^{tot} = \frac{W_{el}^{tot}}{\left(\frac{1-v}{E}\right)} = \int_0^{Th} \sigma^2 \quad (VI)$$

$$W_{norm}^{comp} = 2\frac{W_{el}^{comp}}{\left(\frac{1-v}{E}\right)} = \int_0^{DOC} \sigma^2 \quad (VII)$$

$$W_{norm}^{tens} = 2\frac{W_{el}^{tens}}{\left(\frac{1-v}{E}\right)} = \int_{DOC}^{0.5Th} \sigma^2 \quad (VIII)$$

The normalized energy can be further normalized by the square root of the thickness (represented as parameter "WT"). The WT parameters have the units MPa²m⁰·⁵ and have embedded within them a variable thickness component. The normalized total energy, compressive energy, and tensile energy per thickness can be represented by formulas (IX), (X), and (XI), respectively:

$$WT_{norm}^{tot} = \frac{W_{norm}^{tot}}{\sqrt{Th}} \quad (IX)$$

$$WT_{norm}^{comp} = \frac{W_{norm}^{comp}}{\sqrt{Th}} \quad (X)$$

$$WT_{norm}^{tens} = \frac{W_{norm}^{tens}}{\sqrt{Th}} \quad (XI)$$

According to one embodiment of the present disclosure, the chemically strengthened glass articles described herein can be frangible. Frangible glass articles of the present disclosure can have a center tension (CT) according to formula (XII):

$$CT > ((E/(68 \text{ GPa}))*(75 \text{ MPa})*(1 \text{ mm})^{0.5})/(Th)^{0.5} \quad (XII)$$

wherein E is the Young's modulus of the glass body 12, measured in GPa, and Th is the thickness of the glass body 12, measured in mm.

According to one embodiment, non-frangible glass articles of the present disclosure can have an elastic tensile energy ($W_{el}^{tens}$) of less than about 20 J/m². In some examples, the non-frangible glass articles of the present disclosure can have an elastic tensile energy ($W_{el}^{tens}$) of from about 10 J/m² to about 20 J/m², about 10 J/m² to about 18 J/m², about 12 J/m² to about 20 J/m², about 12 J/m² to about 18 J/m², about 14 J/m² to about 20 J/m², about 14 J/m² to about 18 J/m², about 16 J/m² to about 20 J/m², 16 J/m² to about 18 J/m², or about 18 J/m² to about 20 J/m².

According to one embodiment, non-frangible glass articles of the present disclosure can have a normalized elastic tensile energy per thickness ($WT_{norm}^{tens}$) of less than about 60 MPa²m⁰·⁵. In some examples, the non-frangible glass articles of the present disclosure can have a normalized elastic tensile energy per thickness ($WT_{norm}^{tens}$) of from about 30 MPa²m⁰·⁵ to about 60 MPa²m⁰·⁵, about 30 MPa²m⁰·⁵ to about 50 MPa²m⁰·⁵, about 30 MPa²m⁰·⁵ to about 40 MPa²m⁰·⁵, about 40 MPa²m⁰·⁵ to about 60 MPa²m⁰·⁵, about 30 MPa²m⁰·⁵ to about 50 MPa²m⁰·⁵, or about 50 MPa²m⁰·⁵ to about 60 MPa²m⁰·⁵.

Figure 3:
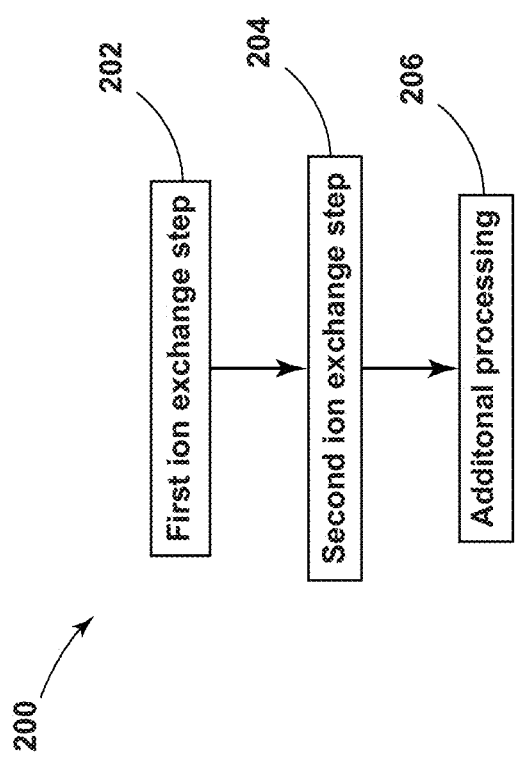
FIG. 3 is a flow chart of a method of chemically strengthening a glass article, according to an aspect of the present disclosure.

FIG. 3 illustrates a method 200 of forming a chemically strengthened glass according to an embodiment of the present disclosure. While the method 200 is described in the context of the exemplary glass article 10 of FIG. 1, it is understood that the method 200 may be utilized with other glasses to provide the glasses with the desired stress profile. The method 200 includes a first ion exchange step 202 in which a glass article is immersed in a first molten salt bath including potassium metal ions and sodium metal ions. The potassium and sodium metal ions can each individually be provided as a salt of a nitrate, sulfate, chloride, or combinations thereof. The salt bath is heated to a suitable temperature to generate a molten salt bath. Typical temperatures for molten salt baths of potassium and sodium metal ions are in the range of from about 380° C. to about 470° C. For example, the molten salt baths may be set at about 380° C., 390° C., 400° C., 410° C., 420° C., 430° C., 440° C., 450° C., 460° C., 470° C., and all molten salt bath temperatures between the foregoing temperatures.

The concentration of each of the potassium salt and the sodium salt used to form the first molten salt bath and an immersion or reaction time period (i.e., the period of time in which the glass article is immersed in the salt bath) can be varied based at least in part on the desired stress profile to be formed in the glass.

According to one embodiment, the first molten salt bath includes about 80% potassium salt and about 20% sodium salt by weight (wt %). In some examples, the first molten salt bath can include a potassium salt in an amount of about 70 wt % to about 90 wt %, about 70 wt % to about 85 wt %, about 70 wt % to about 80 wt %, about 75 wt % to about 90 wt %, about 75 wt % to about 85 wt %, about 75 wt % to about 80 wt %, about 78 wt % to about 90 wt %, about 78 wt % to about 85 wt %, about 78 wt % to about 80 wt %, about 80 wt % to about 90 wt %, about 80 wt % to about 85 wt %, about 82 wt % to about 90 wt %, or about 82 wt % to about 85 wt %, with the balance made from a sodium salt.

The first ion exchange step 202 can include a first reaction time period that is typically greater than about 1 hour and less than about 10 hours. In some embodiments, the first reaction time period for the first ion exchange step 202 can be from about 1 hour to about 10 hours, about 1 hour to about 8 hours, about 1 hour to about 6 hours, about 1 hour to about 4 hours, about 2 hours to about 10 hours, about 2 hours to about 8 hours, about 2 hours to about 6 hours, about 2 hours to about 4 hours, about 4 hours to about 10 hours, about 4 hours to about 8 hours, about 4 hours to about 6 hours, about 6 hours to about 10 hours, or about 6 hours to about 8 hours. For example, the first reaction time period for the first ion exchange step 202 can be about 1 hour, about 2 hours, about 3 hours, about 4 hours, about 5 hours, about 6 hours, about 7 hours, about 9 hours, about 10 hours, or any time period between these values. In an exemplary embodiment, the first reaction time period can be about 6 hours.

Following the first ion exchange step 202, the glass article can be treated in a second ion exchange step 204. The second ion exchange step 204 can include immersing the glass article in a second molten salt bath including potassium metal ions. According to an embodiment of the present disclosure, the second ion exchange step 204 is adapted to form a compressive stress region in the glass article that includes a surface stress (CS) of greater than about 900 MPa (compressive). The potassium metal ions can be provided as a salt of a nitrate, sulfate, chloride, or combinations thereof. Typical temperatures for molten salt baths of potassium metal ions are in the range of from about 380° C. to about 470° C. The concentration of the potassium salt used to form the second molten salt bath and an immersion or reaction time period (i.e., the period of time in which the glass article is immersed in the salt bath) can be varied based at least in part on the desired stress profile to be formed in the glass article, including the desired characteristics of the compressive stress region. In one embodiment, the initial concentration of potassium salt in the second molten salt bath is about 100 wt %.

The second reaction time period can be selected to provide the glass article with a compressive stress region having the desired characteristics, including a surface stress (CS) of greater than about 900 MPa (compressive). The second reaction time period can also be selected to provide additional desired characteristics of the compressive stress region, such as a desired depth of layer ($DOL_k$), a desired stress of the knee ($CS_k$), and/or a desired slope of the spike region of the stress profile. In one embodiment, the second reaction time period is from about 0.5 hours to about 4 hours. For example, the second reaction time period can be from about 0.5 hours to about 4 hours, about 0.5 hours to about 3 hours, about 0.5 hours to about 2 hours, about 0.5 hours to about 1 hour, about 0.75 hours to about 4 hours, about 0.75 hours to about 3 hours, about 0.75 hours to about 2 hours, about 0.75 hours to about 1 hour, about 1 hour to about 4 hours, about 1 hour to about 3 hours, or about 1 hour to about 2 hours. In one embodiment, the second reaction time period is about 0.5 hours. According to one embodiment, the second reaction time period is shorter than the first reaction time period.

According to one aspect of the present disclosure, the first ion exchange step 202 using a given first molten salt bath and the second ion exchange step 204 using a given second molten salt bath can be repeated for multiple ion exchange cycles to treat multiple glass articles before replacing and/or regenerating the first and/or second molten salt baths. As used herein, the term "cycle," as used to describe an ion exchange process, refers to the treatment of a given glass article in the first ion exchange step 202 followed by treatment in the second ion exchange step 204.

Without wishing to be limited by any particular theory, with each ion exchange cycle, the composition of the first and second molten salt baths in the first and second ion exchange steps 202 and 204, respectively, may change. For example, as lithium ions within the glass are exchanged with sodium or potassium ions in the molten salt baths, the concentration of lithium ions in the molten salt baths increase, which can be referred to as "lithium poisoning." As the amount of lithium poisoning in the first and/or second molten salt baths increases, the ability of the method 200 to provide a glass having the desired stress profile may decrease. If the degree of lithium poisoning increases too quickly, i.e., within too few ion exchange cycles, it may be difficult to utilize the method 200 to chemically strengthen glass in a manner suitable for manufacturing. For example, for a given set of ion exchange treatment parameters, as the amount of lithium poisoning in the first and/or second molten salt baths increases, the surface stress (CS) obtainable in the glass article can decrease. Over time, the surface stress (CS) obtainable with the ion exchange treatment may no longer satisfy the minimum required surface stress (CS).

According to one aspect, the first ion exchange step 202 and/or the second ion exchange step 204 can be adapted such that the second ion exchange step forms a compressive stress region having a surface stress (CS) of greater than about 900 MPa (compressive) and such that an amount of the increase in the surface stress of the glass article in the second ion exchange step 204 decreases by less than a predetermined amount per ion exchange cycle. In one aspect, the first ion exchange step 202 and/or the second ion exchange step 204 can be adapted such that an amount of the increase in the surface stress of a glass article in the second ion exchange step 204 decreases by less than about 6 MPa per ion exchange cycle for a glass article load having a surface area of 0.0228 m² per kilogram of potassium salt in the second molten salt bath. For example, an amount of the increase in the surface stress of a glass article may decrease by less than about 6 MPa, less than about 5.5 MPa, less than about 5 MPa, less than about 4.5 MPa, less than about 4 MPa, less than about 3.5 MPa, less than about 3 MPa, less than about 2.5 MPa, less than about 2 MPa, less than about 1.5 MPa, or less than about 1 MPa per ion exchange cycle for a glass article load having a surface area of 0.0228 m² per kilogram of potassium salt in the second molten salt bath. According to another aspect, the first ion exchange step 202 and/or the second ion exchange step 204 can be adapted such that an amount of the increase in the surface stress of a glass article in the second ion exchange step 204 decreases by less than about 2 MPa per ion exchange cycle for a glass article load having a surface area of 0.0065 m² per kilogram of potassium salt in the second molten salt bath. For example, an amount of the increase in the surface stress of a glass article may decrease by less than about 2 MPa, less than about 1.75 MPa, less than about 1.5 MPa, less than about 1.25 MPa, less than about 1 MPa, less than about 0.75 MPa, or less than about 0.5 MPa per ion exchange cycle for a glass article load having a surface area of 0.0065 m² per kilogram of potassium salt in the second molten salt bath.

According to an aspect of the present disclosure, the first and/or second ion exchange steps 202, 204 can be adapted to provide a first glass article treated in an initial ion exchange cycle with a compressive stress region including an initial surface stress (CS) that satisfies a minimum required surface stress (CS) for the glass article based on the intended use of the glass article. The first and/or second ion exchange steps 202, 204 can further be adapted such that a predetermined number of glass articles can be treated in a predetermined number of cycles while still providing a glass article that satisfies the minimum required surface stress (CS). When the surface stress (CS) of a glass article produced using the initial first and/or second molten salt baths does not satisfy the minimum required surface stress (CS), the salt baths can be replaced and/or regenerated. For example, where a minimum surface stress (CS) for a glass article is about 950 MPa, the first and second ion exchange steps 202, 204 can be adapted to provide an initial glass article with a surface stress (CS) of greater than about 1000 MPa and further adapted such that the rate of decrease in the surface stress (CS) obtained in each glass article per cycle allows for a predetermined number of glass articles to be treated before the first and/or second molten salt baths need to be regenerated or replaced.

Figure 4A:
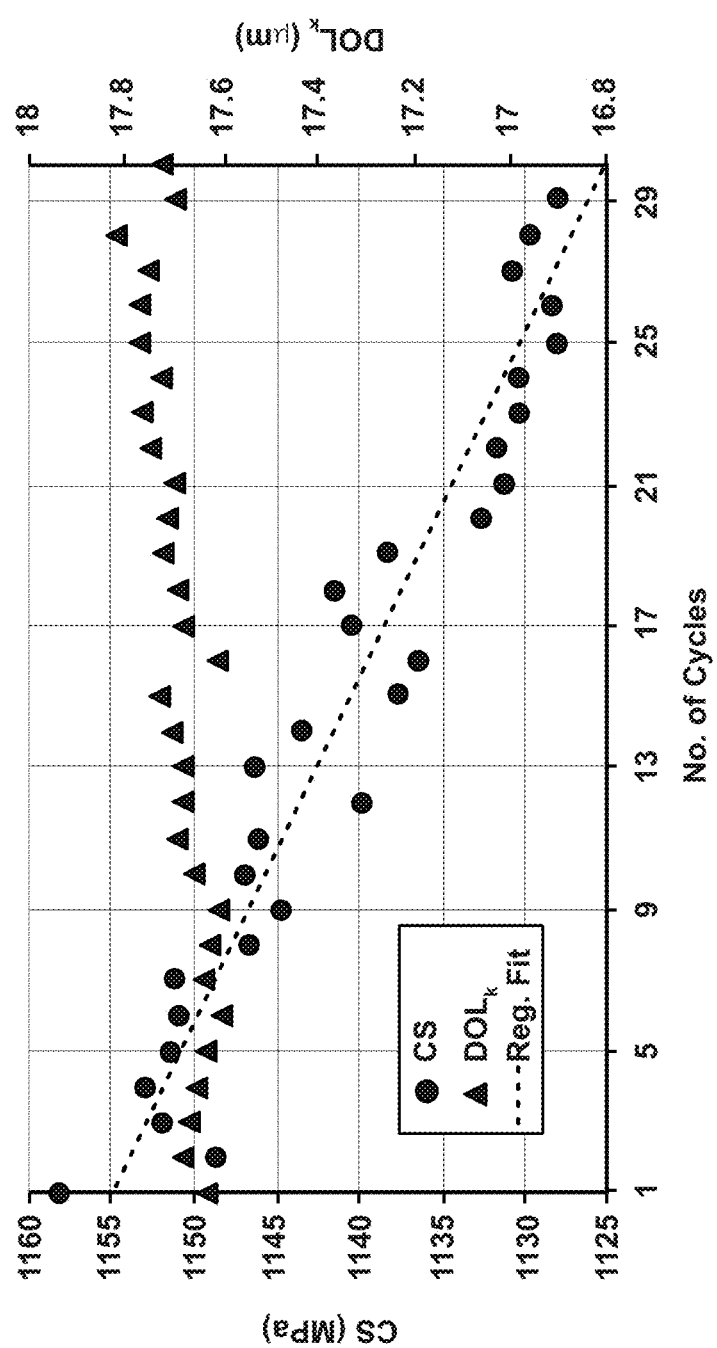
FIG. 4A is a plot of surface stress (CS) and depth of layer (DOLk) as a function of number of cycles of use of a second ion exchange molten salt bath (after immersion in a first ion exchange molten salt bath), according to an aspect of the present disclosure.
Figure 4B:
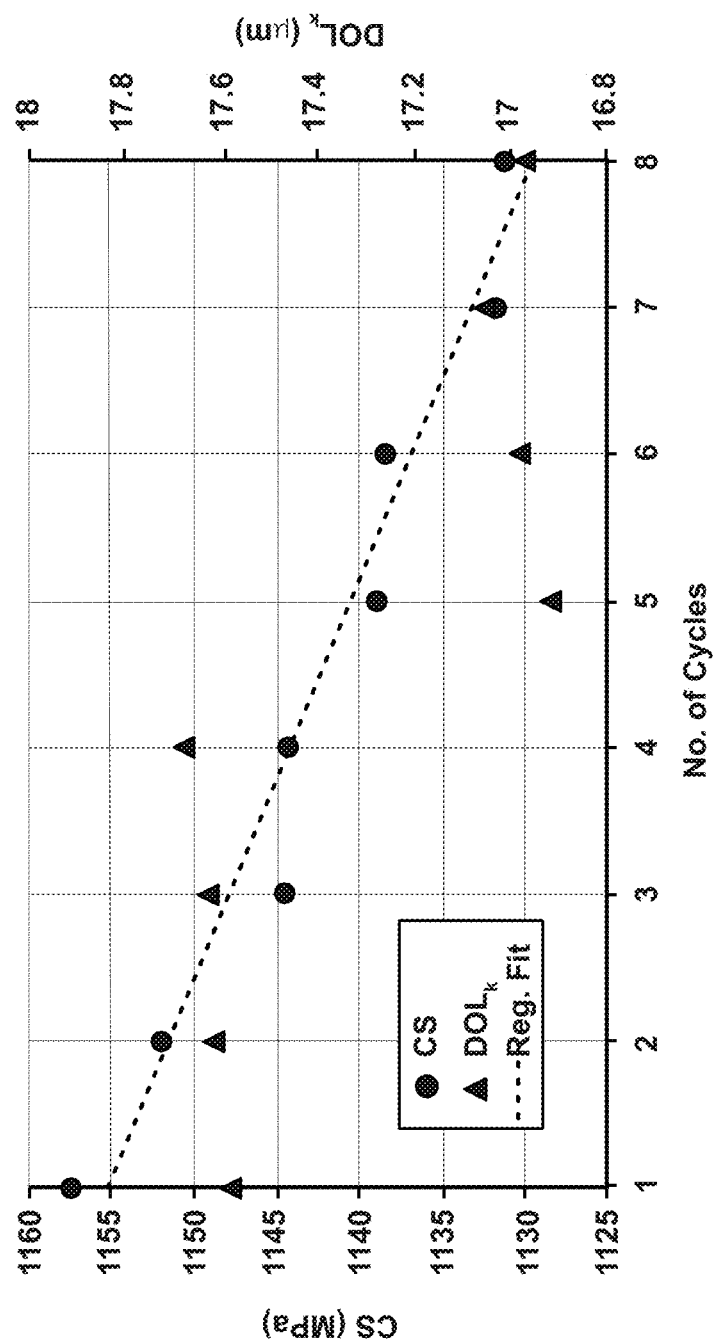
FIG. 4B is a plot of surface stress (CS) and depth of layer (DOLk) as a function of number of cycles of use of a second ion exchange molten salt bath (after immersion in a first ion exchange molten salt bath), of an exemplary ion exchange process, according to an aspect of the present disclosure.

The rate of decrease in surface stress (CS) for an ion exchange process for a given glass article can be determined experimentally or theoretically. For example, a bath lifetime study can be conducted for a given glass article to determine parameters such as initial surface stress (CS), glass load, and/or number of cycles that can be run before a molten salt bath needs to be regenerated or replaced. FIGS. 4A-4B illustrate the results for exemplary bath lifetime studies according to aspects of the present disclosure. The bath lifetime studies shown in FIGS. 4A-4B were conducted on exemplary lithium-based glass samples treated according to the ion exchange process of method 200 of FIG. 3, but with different amounts of glass loading. The glass samples were treated in a first ion exchange step 202 in a first molten salt bath that included 80 wt % potassium and 20 wt % sodium at 390° C. for 6 hours. The glass samples were then treated in a second ion exchange step 204 in a second molten salt bath including 100 wt % potassium at 390° C. for 0.5 hours. FIGS. 4A and 4B show the surface stress (CS) and the depth of layer ($DOL_k$) as a function of number of cycles (i.e., number of glass samples treated) following treatment in the second ion exchange step 204. FIG. 4A shows the results for glass samples loaded at an amount of 0.0065 m² per kilogram of potassium salt in the second molten salt bath. FIG. 4B shows the results for glass samples loaded at an amount of 0.0228 m² per kilogram of potassium salt in the second molten salt bath. The slope of the least squares regression fit ("Reg. Fit") of the surface stress (CS) can be used to estimate the number of cycles that the second molten bath can be used to form glass articles having a desired surface stress (CS) before the bath needs to be regenerated or replaced, i.e., the number of cycles the second molten bath can be used before the surface stress (CS) of a glass article treated in the second molten bath does not satisfy the desired surface stress (CS).

Referring to FIG. 4A, the slope of the least squares regression fit (denoted "Reg. Fit") of the surface stress (CS) is about −1.0216 MPa/cycle. Thus, for an ion exchange process in which it is desired to form glass articles having a surface stress (CS) greater than 950 MPa, the bath lifetime study can be used to estimate how many cycles the second molten bath can be utilized before the second molten bath needs to be regenerated or replaced. In the example of FIG. 4A, the surface stress (CS) of the initial glass sample treated according to the method 200 is about 1155 MPa. Based on the estimate of a decrease in the surface stress (CS) of about −1.0216 MPa/cycle, the bath lifetime study of FIG. 4A can be used to estimate that the second molten bath can be used for approximately 193 cycles with a glass load of 0.0065 m² per kilogram of potassium salt in the second molten salt bath before the surface stress (CS) in the glass falls below 950 MPa.

Referring to FIG. 4B, the slope of the least squares regression fit of the surface stress (CS) is about −3.6685 MPa/cycle. Thus, for an ion exchange process in which it is desired to form glass articles having a surface stress (CS) greater than 950 MPa, the bath lifetime study can be used to estimate how many cycles the second molten bath can be utilized before the second molten bath needs to be regenerated or replaced. In the example of FIG. 4B, the surface stress (CS) of the initial glass sample treated according to the method 200 is about 1155 MPa. Based on the estimate of a decrease in the surface stress (CS) of about −3.6685 MPa/cycle, the bath lifetime study of FIG. 4B can be used to estimate that the second molten bath can be used for approximately 54 cycles with a glass load of 0.0228 m² per kilogram of potassium salt in the second molten salt bath before the surface stress (CS) in the glass falls below 950 MPa.

Bath lifetime studies, such as those discussed with respect to FIGS. 4A and 4B above, can be conducted in a similar manner with respect to the first molten salt bath to determine the effect of other variables of the method 200 on the stress profiles of the treated glass articles, non-limiting examples of which include glass load size, glass type, spike region characteristics, tail region characteristics, DOC, knee region characteristics, first and/or second molten salt bath temperatures, first and/or second molten salt bath concentrations, etc.

According to one aspect of the present disclosure, the method 200 can include replacing or regenerating the second molten salt bath when a concentration of lithium in the second molten salt bath reaches and/or exceeds a predetermined value or falls within a predetermined range. As discussed above, the amount of lithium present in the second molten salt bath, i.e., the amount of lithium poisoning in the second molten salt bath, may affect the degree of surface stress (CS) that can be formed in a glass article treated in the second molten bath. In this manner, the amount of lithium poisoning may be correlated with the surface stress (CS) that can be formed in the glass article and thus may be used as an indicator of when the second molten salt bath needs to be regenerated or replaced in order to continue to be able to form glass articles having the desired surface stress (CS).

In some aspects, the method 200 can be adapted such that the second molten salt bath can be utilized for at least about 10 cycles to form a compressive stress region in the glass having a surface stress (CS) of greater than about 900 MPa (compressive). For example, the method 200 can be adapted such that the second molten salt bath can be utilized for at least about 10 cycles, at least about 15 cycles, at least about 20 cycles, at least about 25 cycles, at least about 30 cycles, at least about 35 cycles, at least about 40 cycles, at least about 50 cycles, at least about 60 cycles, at least about 70 cycles, at least about 80 cycles, at least about 90 cycles, at least about 100 cycles, or at least about 150 cycles to form a compressive stress region in the glass having a surface stress (CS) of greater than about 900 MPa (compressive). In some examples, the method 200 can be adapted such that the second molten salt bath can be utilized for about 10 cycles to about 200 cycles, about 10 cycles to about 150 cycles, about 10 cycles to about 100 cycles, about 10 cycles to about 90 cycles, about 10 cycles to about 80 cycles, about 10 cycles to about 70 cycles, about 10 cycles to about 60 cycles, about 10 cycles to about 50 cycles, about 10 cycles to about 40 cycles, about 10 cycles to about 30 cycles, about 10 cycles to about 20 cycles, about 20 cycles to about 150 cycles, about 20 cycles to about 100 cycles, about 20 cycles to about 90 cycles, about 20 cycles to about 80 cycles, about 20 cycles to about 70 cycles, about 20 cycles to about 60 cycles, about 20 cycles to about 50 cycles, about 20 cycles to about 40 cycles, about 20 cycles to about 30 cycles, about 30 cycles to about 150 cycles, about 30 cycles to about 100 cycles, about 30 cycles to about 90 cycles, about 30 cycles to about 80 cycles, about 30 cycles to about 70 cycles, about 30 cycles to about 60 cycles, about 30 cycles to about 50 cycles, about 30 cycles to about 40 cycles, about 40 cycles to about 150 cycles, about 40 cycles to about 100 cycles, about 40 cycles to about 90 cycles, about 40 cycles to about 80 cycles, about 40 cycles to about 70 cycles, about 40 cycles to about 60 cycles, about 40 cycles to about 50 cycles, about 50 cycles to about 150 cycles, about 50 cycles to about 100 cycles, about 50 cycles to about 90 cycles, about 50 cycles to about 80 cycles, about 50 cycles to about 70 cycles, about 50 cycles to about 60 cycles, about 60 cycles to about 150 cycles, about 60 cycles to about 100 cycles, about 60 cycles to about 90 cycles, about 60 cycles to about 80 cycles, about 60 cycles to about 70 cycles, about 70 cycles to about 150 cycles, about 70 cycles to about 100 cycles, about 70 cycles to about 90 cycles, about 70 cycles to about 80 cycles, about 80 cycles to about 150 cycles, about 80 cycles to about 100 cycles, about 80 cycles to about 90 cycles, about 90 cycles to about 150 cycles, about 90 cycles to about 100 cycles, or about 100 cycles to about 150 cycles. It is understood that while the second molten bath may be capable of forming a compressive stress region in a glass that includes a surfaces stress of greater than about 900 MPa (compressive) for "X" number of cycles, the second molten bath may be replaced or regenerated after a predetermined number of cycles less than X.

In one aspect, the method 200 can include replacing or regenerating the second molten salt bath when a concentration of lithium in the second molten salt bath is greater than about 0.125 wt %. In some aspects, the method 200 can include replacing or regenerating the second molten salt bath when a concentration of lithium in the second molten salt bath is greater than about 0.125 wt %, greater than about 0.25 wt %, greater than about 0.275 wt %, greater than about 0.3 wt %, greater than about 0.325 wt %, greater than about 0.35 wt %, or greater than about 0.375 wt %. In some aspects, the method 200 can include replacing or regenerating the second molten salt bath when a concentration of lithium in the second molten salt bath is from about 0.125 wt % to about 0.5 wt %, about 0.125 wt % to about 0.475 wt %, about 0.125 wt % to about 0.45 wt %, about 0.125 wt % to about 0.425 wt %, about 0.125 wt % to about 0.4 wt %, about 0.125 wt % to about 0.375 wt %, about 0.125 wt % to about 0.35 wt %, about 0.125 wt % to about 0.325 wt %, about 0.125 wt % to about 0.3 wt %, about 0.125 wt % to about 0.275 wt %, about 0.125 wt % to about 0.25 wt %, about 0.125 wt % to about 0.225 wt %, about 0.125 wt % to about 0.2 wt %, about 0.2 wt % to about 0.5 wt %, about 0.2 wt % to about 0.475 wt %, about 0.2 wt % to about 0.45 wt %, about 0.2 wt % to about 0.425 wt %, about 0.2 wt % to about 0.4 wt %, about 0.2 wt % to about 0.375 wt %, about 0.2 wt % to about 0.35 wt %, about 0.2 wt % to about 0.325 wt %, about 0.2 wt % to about 0.3 wt %, about 0.2 wt % to about 0.275 wt %, about 0.2 wt % to about 0.25 wt %, about 0.2 wt % to about 0.225 wt %, about 0.225 wt % to about 0.5 wt %, about 0.225 wt % to about 0.475 wt %, about 0.225 wt % to about 0.45 wt %, about 0.225 wt % to about 0.425 wt %, about 0.225 wt % to about 0.4 wt %, about 0.225 wt % to about 0.375 wt %, about 0.225 wt % to about 0.35 wt %, about 0.225 wt % to about 0.325 wt %, about 0.225 wt % to about 0.3 wt %, about 0.225 wt % to about 0.275 wt %, about 0.225 wt % to about 0.25 wt %, about 0.25 wt % to about 0.5 wt %, about 0.25 wt % to about 0.475 wt %, about 0.25 wt % to about 0.45 wt %, about 0.25 wt % to about 0.425 wt %, about 0.25 wt % to about 0.4 wt %, about 0.25 wt % to about 0.375 wt %, about 0.25 wt % to about 0.35 wt %, about 0.25 wt % to about 0.325 wt %, about 0.25 wt % to about 0.3 wt %, about 0.25 wt % to about 0.275 wt %, about 0.275 wt % to about 0.5 wt %, about 0.275 wt % to about 0.475 wt %, about 0.275 wt % to about 0.45 wt %, about 0.275 wt % to about 0.425 wt %, about 0.275 wt % to about 0.4 wt %, about 0.275 wt % to about 0.375 wt %, about 0.275 wt % to about 0.35 wt %, about 0.275 wt % to about 0.325 wt %, about 0.275 wt % to about 0.3 wt %, about 0.3 wt % to about 0.5 wt %, about 0.3 wt % to about 0.475 wt %, about 0.3 wt % to about 0.45 wt %, about 0.3 wt % to about 0.425 wt %, about 0.3 wt % to about 0.4 wt %, about 0.3 wt % to about 0.375 wt %, about 0.3 wt % to about 0.35 wt %, about 0.35 wt % to about 0.5 wt %, about 0.35 wt % to about 0.475 wt %, about 0.35 wt % to about 0.45 wt %, about 0.35 wt % to about 0.425 wt %, about 0.35 wt % to about 0.4 wt %, about 0.35 wt % to about 0.375 wt %, about 0.4 wt % to about 0.5 wt %, about 0.4 wt % to about 0.475 wt %, or about 0.4 wt % to about 0.45 wt %. It is understood that the amount of lithium poisoning that is acceptable before the second molten salt bath is to be replaced or regenerated may vary based on a variety of factors, one example of which includes a minimum desired surface stress (CS) of the treated glass.

Any suitable method for regenerating the second molten salt bath can be used with the present disclosure. One exemplary method of regenerating the second molten salt bath may include sequestering the lithium present in the bath, such as for example through the use of tri-sodium phosphates or other chemicals capable of sequestering lithium in the salt bath.

At step 206, the glass may optionally undergo one or more additional processing or treatment steps, non-limiting examples of which include annealing, shaping, cutting, laminating, and coating with a functional layer.

EXAMPLES

The following examples describe various features and advantages provided by the disclosure, and are in no way intended to limit the aspects of the present disclosure and appended claims.

Example 1

Figure 5:
FIG. 5 is a stress profile of glass articles treated according to an exemplary ion exchange process having first and second ion exchange steps for different treatment periods in the second ion exchange step, according to an aspect of the present disclosure.

FIG. 5 illustrates stress profiles as a function of depth for exemplary glass samples, Examples 1A-1D, which were treated in an ion exchange process according to aspects of the present disclosure. Examples 1A-1D ("Ex. 1A"-"Ex. 1D") were treated according to the same first and second ion exchange steps except that a reaction time period of the second ion exchange step was varied for each sample. Examples 1A-1D were all aluminosilicate glass samples having a composition including about 64 mol % $SiO_2$, 16 mol % $Al_2O_3$, 11 mol % $Na_2O$, 6.25 mol % $Li_2O$, 1 mol % $TiO_2$, 0.04 mol % $SnO_2$ and 2.5 mol % $P_2O_5$ having a thickness of about 1100 μm. Examples 1A-1D were all treated in a first ion exchange step that included treatment in a first molten salt bath that was 80 wt % potassium and 20 wt % sodium at a temperature of about 390° C. for a reaction time period of about 6 hours. The samples were then all treated in a second ion exchange step that included treatment in a second molten salt bath that was 100 wt % potassium at a temperature of about 390° C. for the following reaction time periods: 30 minutes (Example 1A); 60 minutes (Example 1B); 2 hours (Example 1C); 4 hours (Example 1D). Details of the stress profile for each example is listed in Table 1 below. As discussed above, the stress at the surface (CS) was extrapolated to the Orihara FSM-6000 LE measured value due to uncertainty of the stress profile measurement in the first approximately 2 μm obtained using the refractive near field method.

TABLE 1

Stress Profile Characteristics for Ex. 1A-1D

| Sample | Cs (MPa) | $CS_k$ (MPa) | $DOL_k$ (μm) | CT (MPa) | DOC (μm) |
|---|---|---|---|---|---|
| Ex. 1A | 1155 | 110 | 17.6 | 63 | 192 |
| Ex. 1B | 1130 | 100 | 18.2 | 63 | 187 |
| Ex. 1C | 1095 | 65 | 20.4 | 60 | 187 |
| Ex. 1D | 1066 | 40 | 24.5 | 53 | 160 |

As shown in FIG. 5 and the data in Table 1, all of the Examples 1A-1D exhibited a stress profile that included a compressive stress region having a surface stress (CS) of greater than about 1000 MPa (compressive). Ex. 1A-1D illustrate that as the duration of the reaction time period for the second ion exchange step increases, the stress at the knee region ($CS_k$) can be reduced. Ex. 1A-1D also illustrate that as the duration of the reaction time period for the second ion exchange step increases, the depth of layer ($DOL_k$) can increase, i.e., a thickness of the spike region increases. Without wishing to be limited by any theory, it is believed that the surface stress (CS) and the stress at the knee region ($CS_k$) decrease as the balance of ions from the first ion exchange step is modified by the second ion exchange step. In certain applications, such as automotive applications, a high surface stress may be desirable. Thus, in applications where a maximum high surface stress (CS) is desirable, Ex. 1A-1D suggest that the duration of the second ion exchange should be kept short, such as 0.5 hours in this example. Ex. 1A-1D demonstrate the ability of the method of the present disclosure to form a compressive stress region that includes a high surface stress (e.g., greater than 1000 MPa) that may be desirable in some applications.

Figure 6B:
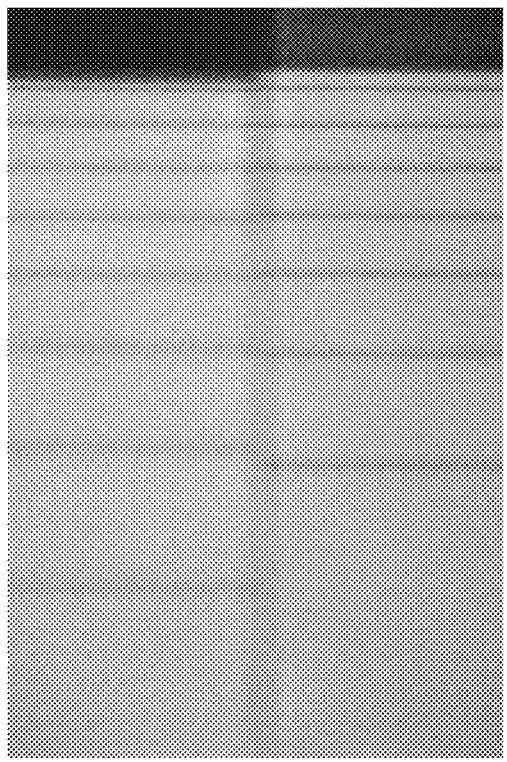
FIG. 6B is an image of the glass article of FIG. 6A following treatment in a second ion exchange step of an exemplary ion exchange process obtained using an FSM-6000 LE surface stress meter from Orihara, Japan, operating at a wavelength of 589 nm, according to an aspect of the present disclosure.
Figure 6A:
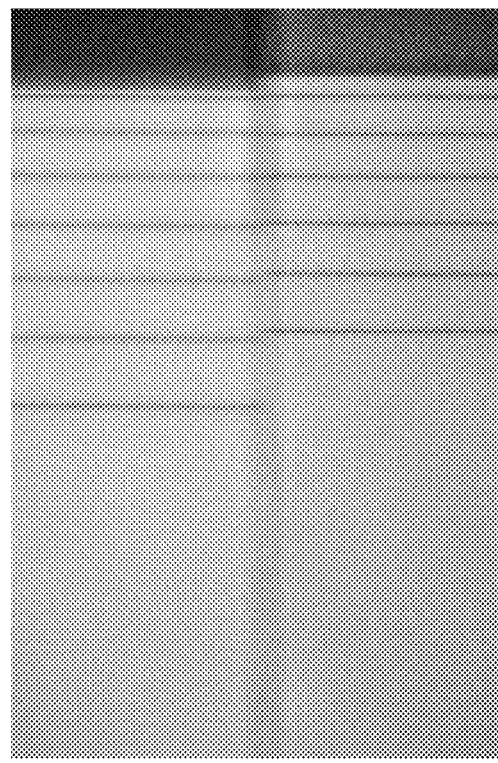
FIG. 6A is an image of a glass article following treatment in a first ion exchange step of an exemplary ion exchange process obtained using an FSM-6000 LE surface stress meter from Orihara, Japan, operating at a wavelength of 589 nm, according to an aspect of the present disclosure.

FIGS. 6A and 6B show images acquired from the FSM-6000 LE surface stress meter, operating at a wavelength of 589 nm, for Ex. 1A. FIG. 6A is an image of the sample following the first ion exchange step and FIG. 6B is an image of the sample following the second ion exchange step. FIG. 6A shows several clear fringes, a surface stress (CS) of 664 MPa, and a depth of layer ($DOL_k$) of 20.0 μm following the first ion exchange step. Because the glass is a lithium-based glass, only the portion that is diffused with potassium can be seen in the image and thus only the spike region can be measured up to the knee region. As shown in FIG. 6B, the second ion exchange step adds an additional set of fringes corresponding to a surface stress (CS) of 1155 MPa and a thickness of the spike region of 17.6 μm (i.e., depth of layer ($DOL_k$)).

Table 2 below shows the energy parameters for the tensile region and the compressive region calculated for Ex. 1A-1D, as described above. The Poisson ratio v and the Young's modulus for the glass of Ex. 1A-1D was about 0.21 and 76.7 GPa, respectively.

The data for Ex. 1A-1D demonstrate that the samples have an elastic energy (per unit area of glass) in the tensile stress region from the depth of compression (DOC) to the center of the glass body $W_{el}^{tens}$ (as determined according to formula (IV) above) of less than 20 J/m$^2$, which may be indicative of non-frangible behavior. The glasses of Ex. 1A-1D also exhibit a normalized tensile energy per thickness $WT_{norm}^{tens}$ of less than about 60 MPa$^2$m$^{0.5}$, which may be indicative of a maximum energy allowed before the glasses begin to exhibit frangible characteristics.

Example 2

Figure 7:
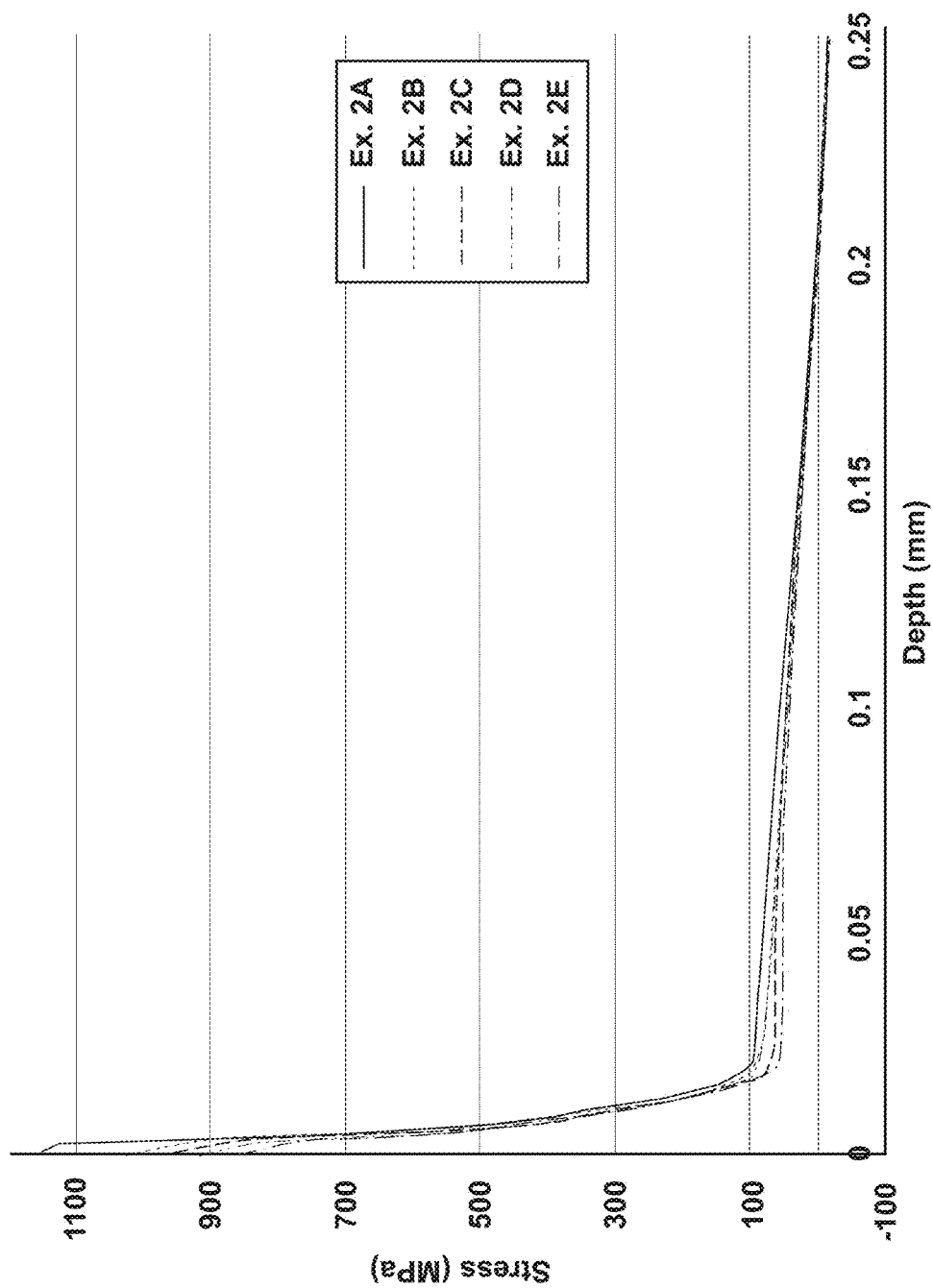
FIG. 7 is a stress profile of glass articles treated according to an exemplary ion exchange process having first and second ion exchange steps with different levels of lithium poisoning in the second ion exchange step, according to an aspect of the present disclosure.

FIG. 7 illustrates stress profiles as a function of depth for exemplary glass samples, Examples 2A-2E, which were treated in an ion exchange process according to aspects of the present disclosure. Examples 2A-2E ("Ex. 2A"-"Ex. 2E") were treated according to the same first and second ion exchange steps except that the second ion exchange step included treatment with a molten salt bath having different amounts of lithium present. As discussed above, the amount of lithium poisoning in the second molten salt bath may increase over time as the second molten salt bath is utilized in multiple ion exchange cycles. The differing amounts of lithium present in the second molten salt bath for Ex. 2A-2E can simulate the lithium poisoning that may occur over time as the second molten salt bath is used for multiple cycles. Examples 2A-2E were all aluminosilicate glass samples having a composition including about 64 mol % SiO$_2$, 16 mol % Al$_2$O$_3$, 11 mol % Na$_2$O, 6.25 mol % Li$_2$O, 1 mol % TiO$_2$, 0.04 mol % SnO$_2$ and 2.5 mol % P$_2$O$_5$ having a thickness of about 1100 μm. Examples 2A-2E were all treated in a first ion exchange step that included treatment in a first molten salt bath that was 80 wt % potassium and 20 wt % sodium at a temperature of about 390° C. for a reaction time period of about 6 hours. The samples were then all treated in a second ion exchange step that included treatment in a second molten salt bath having a concentration of potassium, in wt %, given by the formula (100–x), where x is the amount of lithium present, and where x is equal to: 0 wt % for Ex. 2A; 0.125 wt % for Ex. 2B; 0.25 wt % for Ex. 2C; 0.375 wt % for Ex. 2D; and 0.5 wt % for Ex. 2E. The temperature of the second molten salt bath in the second ion exchange step was about 390° C. and the reaction time period for the second ion exchange step was 0.50 hours for all of the samples (Ex. 2A-2E). Details of the stress profile for each example is listed in Table 3 below. As discussed above, the stress at the surface (CS) was extrapolated to the Orihara FSM-6000 LE measured value due to uncertainty of

TABLE 2

Energy Parameters for Tensile and Compressive Regions of Ex. 1A-1D

| Sample | $W_{el}^{tens}$ (J/m$^2$) | $W_{norm}^{tens}$ (MPa$^2$m) | $W_{norm}^{tens}$ (MPa$^2$m$^{0.5}$) | $W_{el}^{comp}$ (J/m$^2$) | $W_{norm}^{comp}$ (MPa$^2$m) | $W_{norm}^{comp}$ (MPa$^2$m) |
|---|---|---|---|---|---|---|
| Ex. 1A | 18.09 | 1.75 | 52.95 | 104.18 | 10.11 | 304.98 |
| Ex. 1B | 18.81 | 1.82 | 55.06 | 137.55 | 13.35 | 402.67 |
| Ex. 1C | 16.92 | 1.64 | 49.54 | 148.73 | 14.44 | 435.40 |
| Ex. 1D | 12.72 | 1.23 | 37.23 | 157.51 | 15.29 | 461.08 | the stress profile measurement in the first approximately 2 μm obtained using the refractive near field method.

TABLE 3

Stress Profile Characteristics for Ex. 2A-2E

| Sample | [Li] (wt %) | Cs (MPa) | $CS_k$ (MPa) | $DOL_k$ (μm) | CT (MPa) | DOC (μm) |
|---|---|---|---|---|---|---|
| Ex. 2A | 0 | 1155 | 110 | 17 | 63 | 192 |
| Ex. 2B | 0.125 | 1026 | 100 | 17 | 57 | 201 |
| Ex. 2C | 0.25 | 957 | 95 | 17 | 52 | 196 |
| Ex. 2D | 0.375 | 926 | 80 | 17 | 49 | 196 |
| Ex. 2E | 0.50 | 880 | 65 | 17 | 47 | 207 |

The results for Ex. 2A-2E demonstrate that as the concentration of lithium in the second molten salt bath increases, the surface stress (CS) and the stress at the knee region ($CS_k$) decreases. In contrast, the depth of layer ($DOL_k$) and depth of compression (DOC) remain fairly constant. In applications where a minimum surface stress (CS) is required, the results of EX. 2A-2E demonstrate that the amount of lithium poisoning in the molten salt bath may be directly related to the surface stress (CS) obtainable in the treated glass. This information can be utilized to configure the parameters of the ion exchange process to obtain an ion exchanged glass having the desired characteristics. For example, in an exemplary case in which a surface stress of greater than 950 MPa is desired, the results for Ex. 2A-2E suggest that the second molten salt bath can produce an ion exchanged glass having a surface stress (CS) of greater than 950 MPa while the lithium concentration in the second molten salt bath remains below about 0.25 wt %. Above 0.25 wt %, the results of Ex. 2A-2E suggest that an ion exchanged glass treated in the second molten salt bath may have a surface stress (CS) of less than about 950 MPa, and thus the second molten salt bath may need to be replaced or regenerated in order to continue to produce glasses having the desired surface stress (CS).

Figure 8:
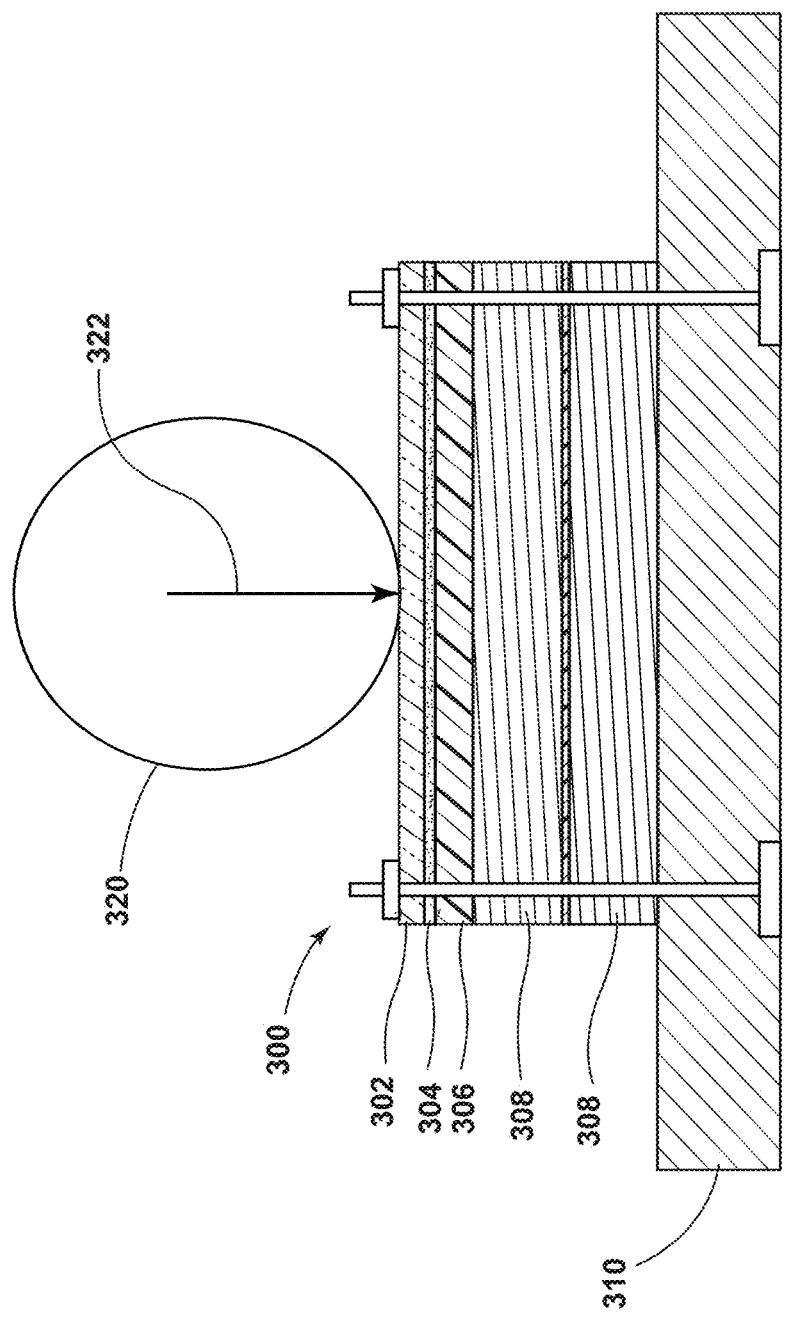
FIG. 8 is a schematic of a HIT system for determining surface failure of a glass article, according to an aspect of the present disclosure.

Table 4 below shows the result of a modeled headform impact test (HIT) for Ex. 2A-2E. The HIT system 300 is illustrated schematically in FIG. 8. The HIT system 300 was designed to represent biaxial bending cases during head impact, which typically have a 35% or higher deceleration than the relevant U.S. HIT regulation FMVSS 201. The HIT system 300 was designed for a 3 millisecond deceleration of 110 G, with a maximum deceleration of 125 G, whereas the relevant regulation requires a 3 millisecond deceleration of 80 G. Thus, samples passing the HIT system 300 testing can reasonably be expected to pass the relevant .S. HIT regulation.

Figure 9:
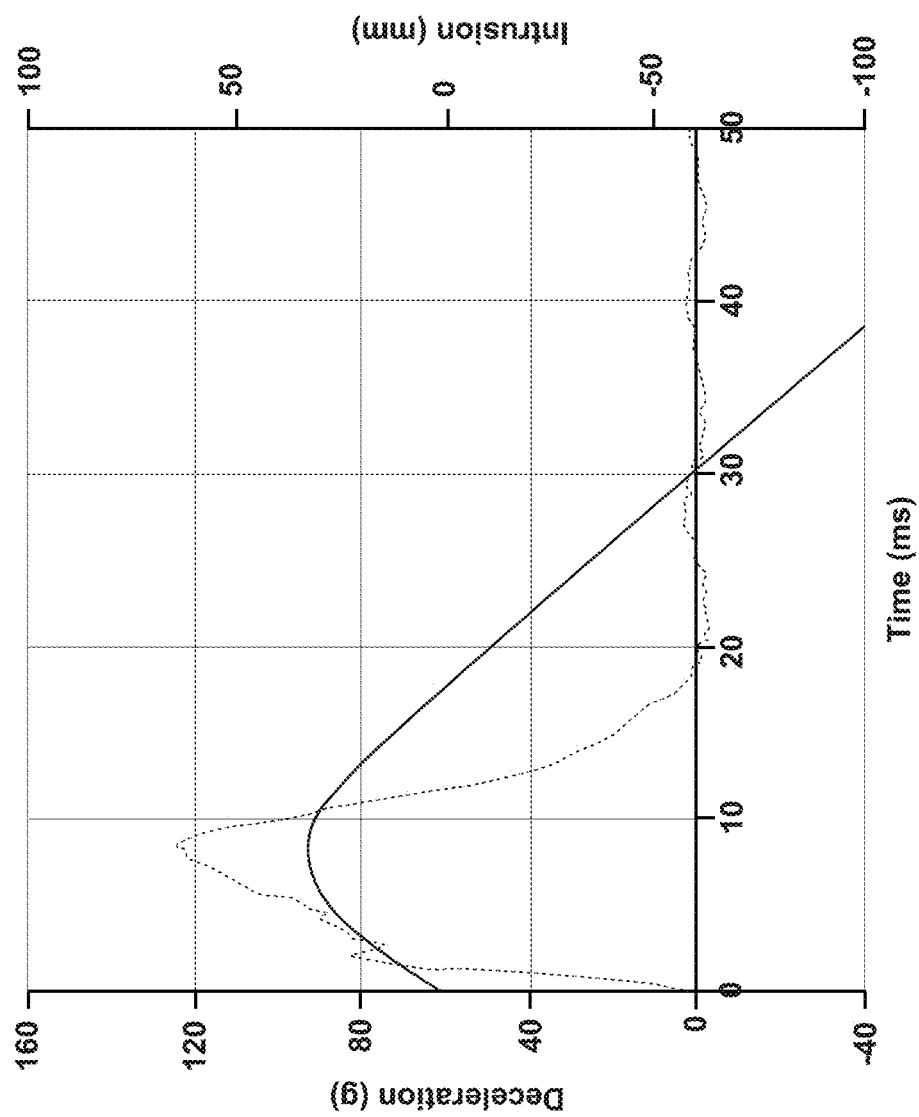
FIG. 9 is a plot of exemplary deceleration and intrusion curves measured using the HIT system of FIG. 8, according to an aspect of the present disclosure.

The HIT system 300 includes a glass sample 302 having a thickness of about 1100 μm and a sample size of about 91 mm by about 152 mm (about 3.6 inches by about 6 inches). The glass samples 302 were finished using a 400-grit edge polishing followed by a 800-grit edge polishing with a bullnose edge. The glass sample 302 was mounted with double-sided tape 304 to a polymeric plate 306 that was supported on two pieces of foam 308. The entire set-up was coupled to a metal frame 310 having sufficient rigidity to be able to neglect deformation of the metal frame 310 in the test. The double-sided tape 304 was a 101.6 mm×152.4 mm piece of 3M™ VHB™ tape having a thickness of 0.127 mm (3M™ product number F9496PC). The polymeric plate 306 was a 149.2 mm by 193.6 mm piece of white Delrin® acetal resin having a thickness of 3.175 mm (available from McMaster Carr). The foam pieces 308 were each a 149.2 mm by 193.6 mm piece of FOAMULAR® 250 extruded polystyrene (XPS) rigid foam, having a thickness of 25.4 mm (available from Owens Corning). An impactor head 320 was about 165 mm in diameter and weighed about 6.8 kg. During the test, the impactor head 320 was directed to impact the glass sample 302 at a 90 degree orientation at a speed of 6.67 m/s (as indicated by arrow 322). The impactor head 320 is configured to simulate a human head. The results for 20 samples of each of Ex. 2A-2E are shown in Table 4 below. FIG. 9 illustrates typical deceleration and intrusion response curves obtained by the HIT system 300 for the exemplary glasses.

TABLE 4

HIT Results for Ex. 2A-2E

| Sample | [Li] (wt %) | Cs (MPa) | $DOL_k$ (μm) | Surface Fail | Surface Failure Rate | Failure Mode (visual inspection) |
|---|---|---|---|---|---|---|
| Ex. 2A | 0 | 1155 | 17 | 0 | 0% | 1 edge failure |
| Ex. 2B | 0.125 | 1026 | 17 | 0 | 0% | N/A |
| Ex. 2C | 0.25 | 957 | 17 | 0 | 0% | 1 edge failure |
| Ex. 2D | 0.375 | 926 | 17 | 1 | 5% | 1 surface failure |
| Ex. 2E | 0.50 | 880 | 17 | 1 | 5% | 1 surface failure |

The HIT results of Table 4 show that surface failures start to occur between lithium poisoning levels of about 0.25 wt % Li to about 0.375 wt % Li, which corresponds to glasses having a surface stress (CS) of between about 957 MPa to about 926 MPa. In this test, the edge failure due to poor edge finishing of the glass samples was not counted as a surface failure.

The following non-limiting aspects are encompassed by the present disclosure. To the extent not already described, any one of the features of the first through the twenty-seventh aspect may be combined in part or in whole with features of any one or more of the other aspects of the present disclosure to form additional aspects, even if such a combination is not explicitly described.

According to a first aspect of the present disclosure, a glass article includes a glass body having first and second opposing primary surfaces and a thickness defined between the primary surfaces, and wherein the glass body includes a compressive stress region that includes: a surface stress of greater than about 900 MPa (compressive); a spike region having a first slope; and a tail region having a second slope, and wherein the spike region and the tail region intersect at a knee region having a stress of greater than about 35 MPa (compressive), and wherein the stress at the knee region is defined as the point where the asymptotic extrapolation of the spike region and the tail region intersect, and wherein the first slope of the spike region is steeper than about −30 MPa/μm.

According to a second aspect of the present disclosure, the glass article of aspect 1, wherein the compressive stress region includes a depth of compression where the stress inside the glass body is 0 or greater than about 0.16*(Th), where Th is the thickness of the glass body.

According to a third aspect of the present disclosure, the glass article of aspect 2, wherein a slope of the tail region from the knee region to the depth of compression is greater than about 241/(Th) MPa/μm, where Th is the thickness of the glass body in μm.

According to a fourth aspect of the present disclosure, the glass article of any one of aspects 1-3, wherein a depth of layer of the spike region is greater than about 10 μm.

According to a fifth aspect of the present disclosure, the glass article of any one of aspects 1-4, wherein the compressive stress region includes a surface stress of greater than about 950 MPa (compressive).

According to a sixth aspect of the present disclosure, the glass article of any one of aspects 1-5, wherein the glass body is non-frangible and includes a tension at the center of the glass body (CT) according to formula (I):

$$CT < (E/68 \text{ GPa})*75 \text{ MPa}*1 \text{ mm}^{0.5}/(th)^{0.5} \quad (I)$$

wherein E is the Young's modulus of the glass body, measured in GPa, and Th is the thickness of the glass body, measured in millimeters.

According to a seventh aspect of the present disclosure, the glass article of any one of aspects 1-6, wherein the glass body is non-frangible and includes a tensile energy ($W_{el}^{tens}$) of less than about 20 J/m$^2$.

According to an eighth aspect of the present disclosure, the glass article of any one of aspects 1-8, wherein the glass body is non-frangible and includes a normalized tensile energy per thickness ($WT_{norm}^{tens}$) of less than about 60 MPa$^2$m$^{0.5}$.

According to a ninth aspect of the present disclosure, the glass article of any one of aspects 1-5, wherein the glass body is frangible and includes a tension at the center of the glass body (CT) according to formula (I):

$$CT > (E/68 \text{ GPa})*75 \text{ MPa}*1 \text{ mm}^{0.5}/(Th)^{0.5} \quad (I)$$

wherein E is the Young's modulus of the glass body, measured in GPa, and Th is the thickness of the glass body, measured in millimeters.

According to a tenth aspect of the present disclosure, the glass article of any one of aspects 1-5 or aspect 9, wherein the glass body is frangible and includes a tensile energy ($W_{el}^{tens}$) of greater than about 20 J/m$^2$.

According to an eleventh aspect of the present disclosure, the glass article of any one of aspects 1-5 or aspects 9-10, wherein the glass body is frangible and includes a normalized tensile energy per thickness ($WT_{norm}^{tens}$) of greater than about 60 MPa$^2$m$^{0.5}$.

According to a twelfth aspect of the present disclosure, the glass article of any one of aspects 1-11, wherein the thickness of the glass body is from about 0.2 mm to about 1.3 mm.

According to a thirteenth aspect of the present disclosure, a method of forming a plurality of glass articles, including: a first ion exchange step including immersing a glass article in a first molten salt bath including a potassium salt and a sodium salt for a first predetermined time period, wherein the glass article includes a glass body having first and second opposing primary surfaces and a thickness defined between the primary surfaces; a second ion exchange step, following the first ion exchange step, including immersing the glass article in a second molten salt bath including a potassium salt for a second predetermined time period to form a compressive stress region including a surface stress of greater than about 900 MPa (compressive); and repeating the first ion exchange step and the second ion exchange step for one or more additional glass articles, wherein an amount of the increase in the surface stress of each glass article in the second ion exchange process decreases by less than about 6 MPa per cycle of first and second ion exchange steps for a glass article load having a surface area of 0.0228 m$^2$ per kilogram of potassium salt in the second molten salt bath.

According to a fourteenth aspect of the present disclosure, the method of aspect 13, wherein an amount of the increase in the surface stress of each glass article in the second ion exchange step decreases by less than about 2 MPa per cycle for a glass article load having a surface area of 0.0065 m$^2$ per kilogram of potassium salt in the second molten salt bath.

According to a fifteenth aspect of the present disclosure, the method of aspect 13 or aspect 14, wherein an initial concentration of potassium salt in the second molten salt bath is 100% (by weight).

According to a sixteenth aspect of the present disclosure, the method of any one of aspects 13-15, wherein a compressive stress region of a first glass treated in the second ion exchange step includes a surface stress of greater than about 1000 MPa.

According to a seventeenth aspect of the present disclosure, the method of any one of aspects 13-16, wherein the first molten salt bath includes about 80% potassium and 20% sodium (by weight).

According to an eighteenth aspect of the present disclosure, the method of any one of aspects 13-17, wherein the plurality of glass articles include lithium-based glass, the method further including one of replacing or regenerating the second molten salt bath when a concentration of lithium in the second molten salt bath is from about 0.125% to about 0.25% (by weight).

According to a nineteenth aspect of the present disclosure, the method of any one of aspects 13-18, wherein the second predetermined time period includes from about 0.5 hours to about 4 hours.

According to a twentieth aspect of the present disclosure, the method of any one of aspects 13-19, wherein the first predetermined time period includes about 6 hours.

According to a twenty-first aspect of the present disclosure, the method of any one of aspects 13-20, wherein the compressive stress region further includes: a spike region having a first slope; and a tail region having a second slope, and wherein the spike region and the tail region intersect at a knee region having a stress of greater than about 35 MPa (compressive), wherein the stress at the knee region is defined as the point where the asymptotic extrapolation of the spike region and the tail region intersect, and wherein the first slope of the spike region is steeper than about −30 MPa/μm.

According to a twenty-second aspect of the present disclosure, the method of aspect 21, wherein the compressive stress region includes a depth of compression where the stress inside the glass body is 0 or greater than about 0.16*(Th), where Th is the thickness of the glass body.

According to a twenty-third aspect of the present disclosure, the method of aspect 21 or aspect 22, wherein a slope of the tail region from the knee region to the depth of compression is greater than about 241/(Th) MPa/μm, where Th is the thickness of the glass body in μm.

According to a twenty-fourth aspect of the present disclosure, method of any one of aspects 21-23, wherein a depth of layer of the spike region is greater than about 10 μm.

According to a twenty-fifth aspect of the present disclosure, method of any one of aspects 13-24, wherein the glass body is non-frangible and includes one of: a tension at the center of the glass body (CT) according to formula (I):

$$CT < (E/68 \text{ GPa})*75 \text{ MPa}*1\text{mm}_{0.5}/(Th)^{0.5} \quad (I)$$

wherein E is the Young's modulus of the glass body, measured in GPa, and Th is the thickness of the glass body, measured in millimeters; a tensile energy ($W_{el}^{tens}$) or less than about 20 J/m$^2$; a normalized tensile energy per thickness ($WT_{norm}^{tens}$) of less than about 60 MPa$^2$m$^{0.5}$; or combinations thereof.

According to a twenty-sixth aspect of the present disclosure, the method of any one of aspects 13-24, wherein the glass body is frangible and includes one of: a tension at the center of the glass body (CT) according to formula (I):

$$CT > (E/68 \text{ GPa}) * 75 \text{MPa} * 1 \text{ mm}^{0.5}/(Th)^{0.5} \quad (I)$$

wherein E is the Young's modulus of the glass body, measured in GPa, and Th is the thickness of the glass body, measured in millimeters; a tensile energy ($W_{el}^{tens}$) of greater than about 20 J/m$^2$; a normalized tensile energy per thickness ($WT_{norm}^{tens}$) of greater than about 60 MPa$^2$m$^{0.5}$; or combinations thereof.

According to a twenty-seventh aspect of the present disclosure, the method of any one of aspects 13-26, wherein the thickness of the glass body is from about 0.2 mm to about 1.3 mm.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A glass article, comprising:
    a glass body having first and second opposing primary surfaces and a thickness defined between the primary surfaces, and
    wherein the glass body comprises a compressive stress region that comprises:
        a surface stress of greater than about 900 MPa (compressive);
        a spike region having a first slope; and
        a tail region having a second slope,
        wherein the spike region and the tail region intersect at a knee region having a stress of greater than about 35 MPa (compressive), and wherein the stress at the knee region is defined as the point where the asymptotic extrapolation of the spike region and the tail region intersect,
        wherein the first slope of the spike region is steeper than about −50 MPa/μm,
        wherein the glass body comprises a tension at a center of the glass body (CT) according to formula (I):

$$CT < (E/68 \text{ GPa}) * 75 \text{ MPa} * 1 \text{ mm}^{0.5}/(Th)^{0.5} \quad (I),$$

wherein E is the Young's modulus of the glass body, measured in GPa, and Th is the thickness of the glass body, measured in millimeters, and
   wherein the compressive stress region comprises a depth of compression where the stress inside the glass body is 0 of greater than about 0.16*(Th).

2. The glass article of claim 1, wherein the second slope of the tail region from the knee region to the depth of compression is greater than about 50/(Th) MPa/μm, when Th is expressed in μm.

3. The glass article of claim 1, wherein the surface stress is greater than or equal to 950 MPa and less than or equal to 1200 MPa.

4. The glass article of claim 1, wherein a depth of layer of the spike region is greater than 10 μm.

5. The glass article of claim 1, wherein the tail region extends from depth of layer (DOL$_k$) through the center, wherein DOL$_k$ is greater than or equal to 15 μm and less than or equal to 40 μm.

6. The glass article of claim 5, wherein the stress at the knee region is greater than or equal to 50 MPa and less than or equal to 100 MPa.

7. The glass article of claim 1, wherein depth of compression is greater than or equal to 0.18*(Th) and less than or equal to 0.2115*(Th).

8. The glass article of claim 1, wherein CT is greater than or equal to 40 MPa and less than or equal to 50 MPa.

9. The glass article of claim 1, wherein the glass body comprises a tensile energy ($W_{el}^{tens}$) of less than about 20 J/m$^2$.

10. The glass article of claim 1, wherein the glass body comprises a normalized tensile energy per thickness ($WT_{norm}^{tens}$) of less than about 60 MPa$^2$m$^{0.5}$.

11. The glass article of claim 1, wherein the glass body is a planar article.

12. The glass article of claim 1, further comprising a metal frame coupled to the glass body.

13. The glass article of claim 12, wherein, when the glass body is impacted by an impactor having a diameter of 165 mm and a weight of 6.8 km at a 90 degree orientation and a speed of 6.67 m/s such that deformation of the metal frame caused by the impactor is negligible, the glass body does not exhibit surface failure.

14. The glass article of claim 1, wherein the glass body comprises a curved shape.

15. The glass article of claim 1, wherein the second slope of the tail region is steeper than 100/(Th), when Th is expressed in μm.

16. The glass article of claim 1, wherein the second slope of the tail region is steeper than 241/(Th), when Th is expressed in μm.

* * * * *